(12) United States Patent
Hashimura

(10) Patent No.: US 6,384,985 B1
(45) Date of Patent: May 7, 2002

(54) ZOOM LENS SYSTEM

(75) Inventor: Junji Hashimura, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/157,416

(22) Filed: Sep. 21, 1998

(30) Foreign Application Priority Data

Sep. 22, 1997 (JP) .............................................. 9-257204

(51) Int. Cl.$^7$ .............................................. G02B 15/14
(52) U.S. Cl. ...................................... 359/686; 359/687
(58) Field of Search .................................. 359/676, 683, 359/686, 687, 688

(56) References Cited

U.S. PATENT DOCUMENTS

| 4,995,708 | A | * | 2/1991 | Sugiura ....................... 359/683 |
| 4,998,807 | A | | 3/1991 | Uzawa et al. |
| 5,146,366 | A | * | 9/1992 | Mukaiya ...................... 359/683 |
| 5,313,328 | A | | 5/1994 | Aoki |
| 5,321,552 | A | | 6/1994 | Horiuchi et al. |
| 5,541,775 | A | | 7/1996 | Kiriki |
| 5,717,525 | A | * | 2/1998 | Estelle et al. ................. 359/677 |
| 5,872,658 | A | * | 2/1999 | Ori ............................. 359/686 |
| 5,923,478 | A | * | 7/1999 | Hashimura .................. 358/686 |
| 6,049,431 | A | * | 4/2000 | Tochigi ........................ 359/687 |

FOREIGN PATENT DOCUMENTS

JP          H4-369611          12/1992

* cited by examiner

*Primary Examiner*—Scott J. Sugarman
(74) *Attorney, Agent, or Firm*—Burns, Doane, Swecker & Mathis, LLP

(57) ABSTRACT

A zoom lens system has a first lens unit having a positive optical power, a second lens unit having a negative optical power, a third lens unit, and a fourth lens unit. In this zoom lens system, a zooming operation is performed by varying distances between the first, second, third, and fourth lens units, and the following condition is fulfilled:

$$0.4 < |\phi 2/\phi W| < 0.8$$

where
$\phi 2$ represents an optical power of the second lens unit; and
$\phi W$ represents an optical power of the entire zoom lens system at the wide-angle end.

33 Claims, 8 Drawing Sheets

SPHERICAL ABERRATION

ASTIGMATISM

DISTORTION %

SPHERICAL ABERRATION

ASTIGMATISM

DISTORTION %

SPHERICAL ABERRATION

ASTIGMATISM

DISTORTION %

SPHERICAL ABERRATION
— d LINE
--- f LINE
—·— c LINE

ASTIGMATISM
— DS
--- DM

DISTORTION %

SPHERICAL ABERRATION
— d LINE
--- f LINE
—·— c LINE

ASTIGMATISM
— DS
--- DM

DISTORTION %

SPHERICAL ABERRATION
— d LINE
--- f LINE
—·— c LINE

ASTIGMATISM
— DS
--- DM

DISTORTION %

ZOOM LENS SYSTEM

This application is based on application No. H9-257204 filed in Japan, the content of which is hereby incorporated by reference.

BACKGROUND OF THE INVENTION

1. Field of the Invention

The present invention relates to a zoom lens system, and more particularly to a high-aperture-ratio and high-magnification zoom lens system suitable for photographic cameras and video cameras.

2. Description of the Prior Art

Conventionally, for use in photographic cameras and video cameras, various zoom lens systems have been proposed that consist of four lens units that are, from the object side, a first lens unit having a positive optical power, a second lens unit having a negative optical power, a third lens unit, and a fourth lens unit. For instance, Japanese Laid-Open Patent Application No. H4-369611 proposes a zoom lens system consisting of four lens units that are, from the object side, a first lens unit having a positive optical power, a second lens unit having a negative optical power, a third lens unit, and a fourth lens unit, with at least one of these lens units including a gradient-index lens element (i.e. a lens element having an index distribution).

However, this zoom lens system has the following disadvantage: whereas the number of lens elements is successfully reduced by the use of a gradient-index lens element in some of the lens units, an unduly large number of lens elements are required in the second lens unit to obtain a strong optical power as desired there.

SUMMARY OF THE INVENTION

An object of the present invention is to provide a high-performance zoom lens system that, despite providing a high aperture ratio and a high magnification, consists of as few constituent lens elements as possible.

To achieve the above object, according to one aspect of the present invention, a zoom lens system is provided with, from the object side, a first lens unit having a positive optical power, a second lens unit having a negative optical power, a third lens unit, and a fourth lens unit. Additionally, this lens system fulfills the condition shown below:

$$0.4<|\phi2/\phi W|<0.8$$

where $\phi2$ represents the optical power of the second lens unit; and $\phi W$ represents the optical power of the entire zoom lens system at the wide-angle end.

According to another aspect of the present invention, in the above zoom lens system, at least one of the first to fourth lens units includes a gradient-index lens element that fulfills the condition shown below:

$$0<sgn[\phi G]\cdot N1/\phi G^2<10.0$$

where sgn[$\phi G$] represents a parameter whose value equals +1 when the optical power of the lens unit including the gradient-index lens element is negative and equals −1 when the optical power of the lens unit including the gradient-index lens element is positive;

N1 represents the index distribution coefficient of the second order of the gradient-index lens element; and $\phi G$ represents the optical power of the lens unit including the gradient-index lens element.

According to another aspect of the present invention, in one of the above two zoom lens systems, the second lens unit includes a gradient-index lens element.

According to still another aspect of the present invention, in one of the above three zoom lens systems, the gradient-index lens element has at least one surface having a diffractive optical power (i.e. a diffractive optical'surface).

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, zoom lens systems embodying the present invention will be described with reference to the accompanying drawings.

Figure 1A:
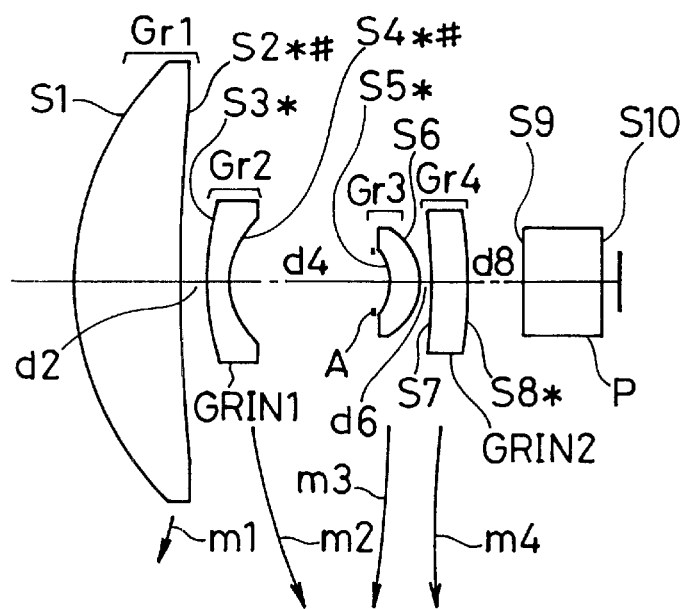
FIGS. 1A to 1C are lens arrangement diagrams of the zoom lens system of a first embodiment (Example 1) of the present invention.
Figure 1B:
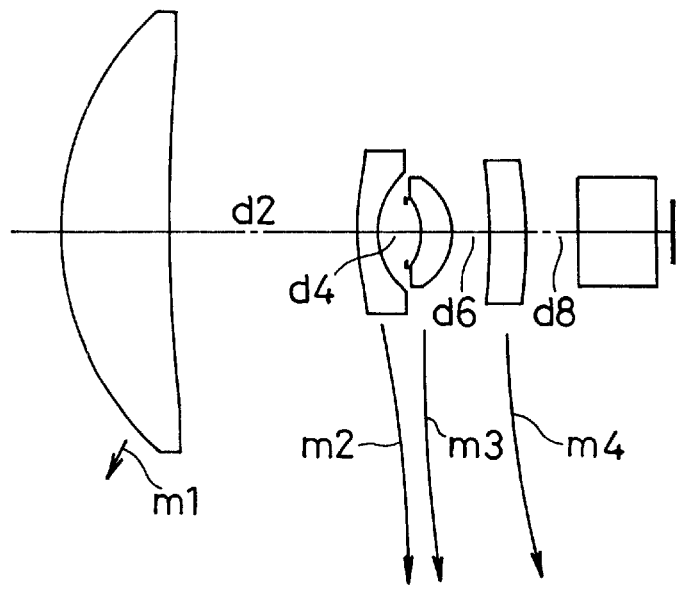
Figure 1C:
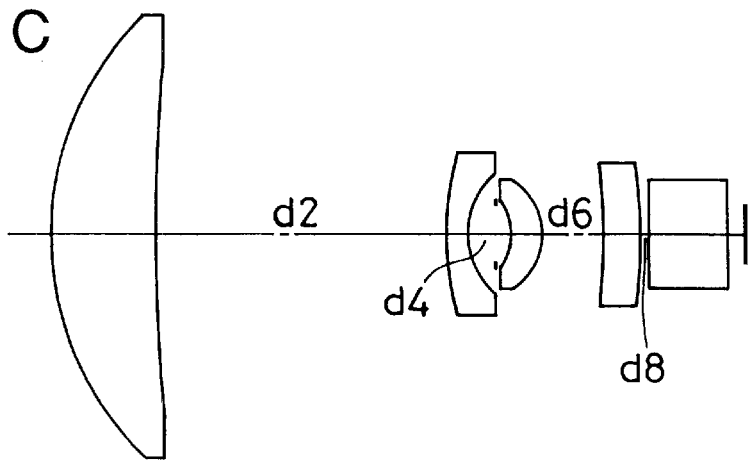
Figure 3A:
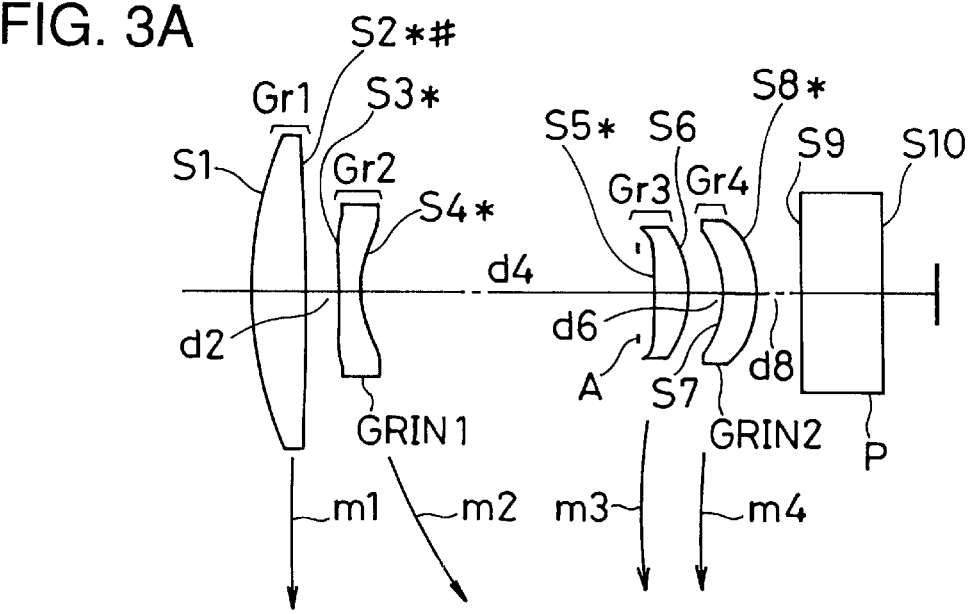
FIGS. 3A to 3C are lens arrangement diagrams of the zoom lens system of a second embodiment (Example 2) of the present invention.
Figure 3B:
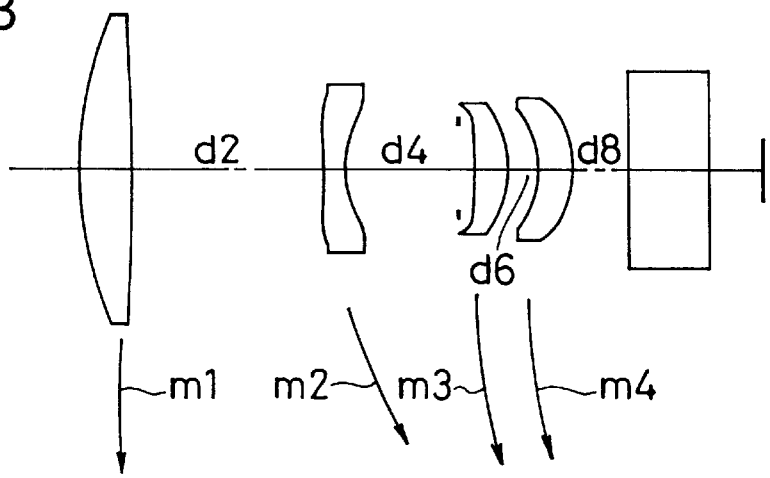
Figure 3C:
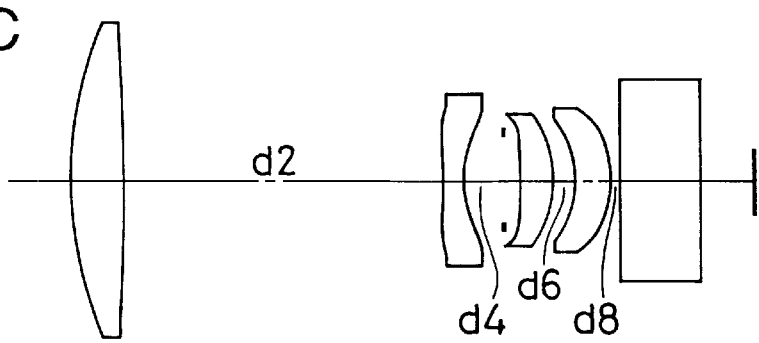
Figure 5A:
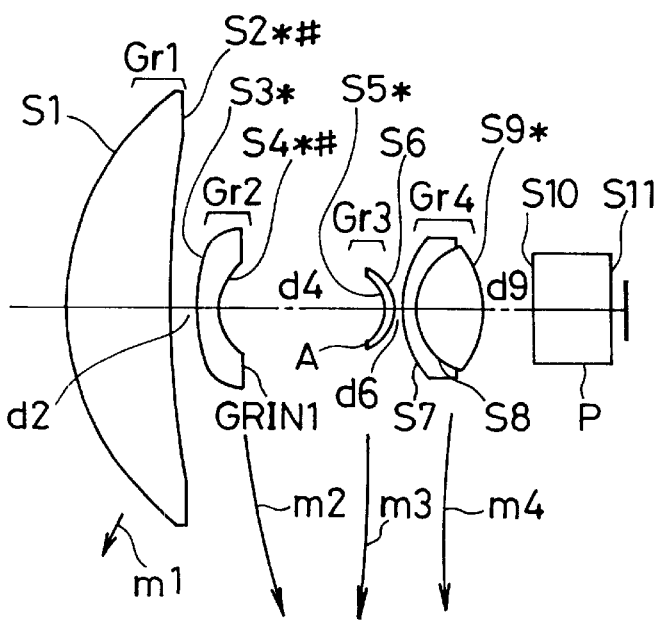
FIGS. 5A to 5C are lens arrangement diagrams of the zoom lens system of a third embodiment (Example 3) of the present invention.
Figure 5B:
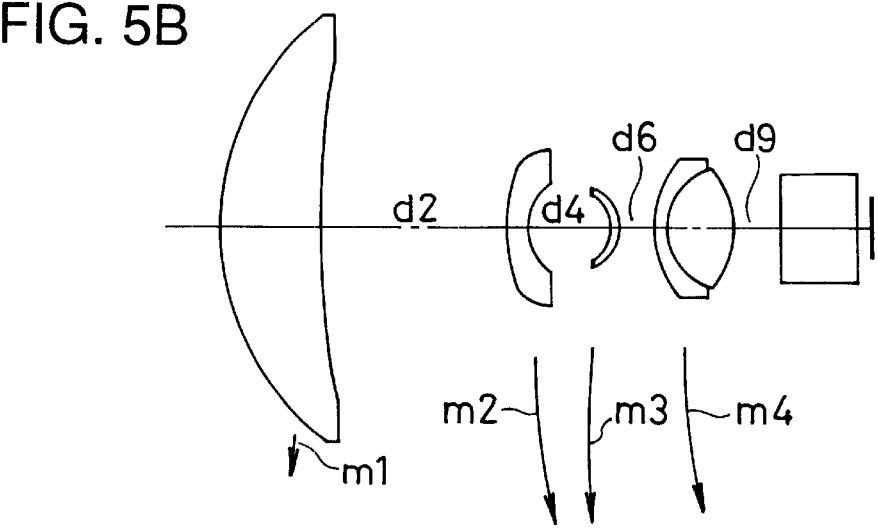
Figure 5C:
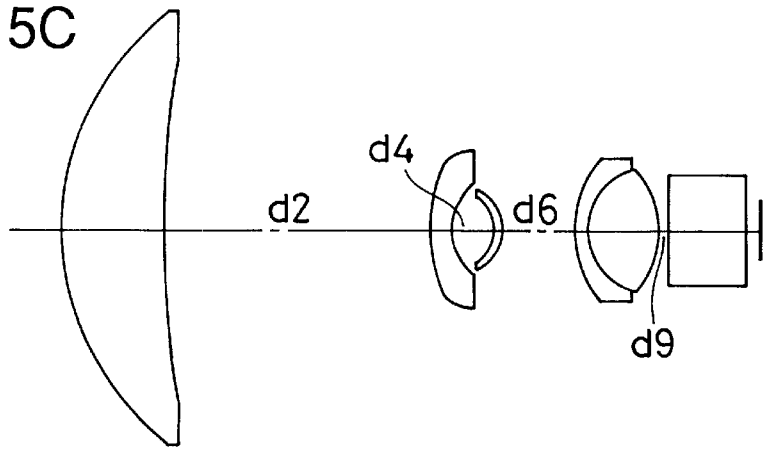
Figure 7A:
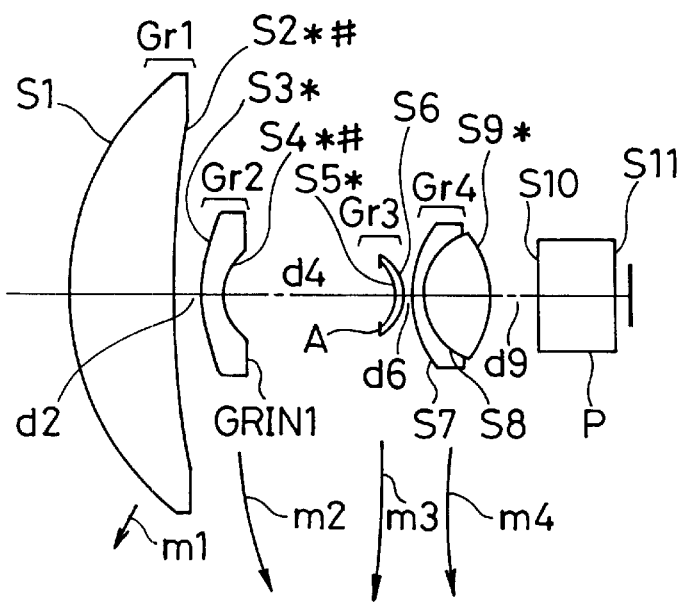
FIGS. 7A to 7C are lens arrangement diagrams of the zoom lens system of a fourth embodiment (Example 4) of the present invention.
Figure 7B:
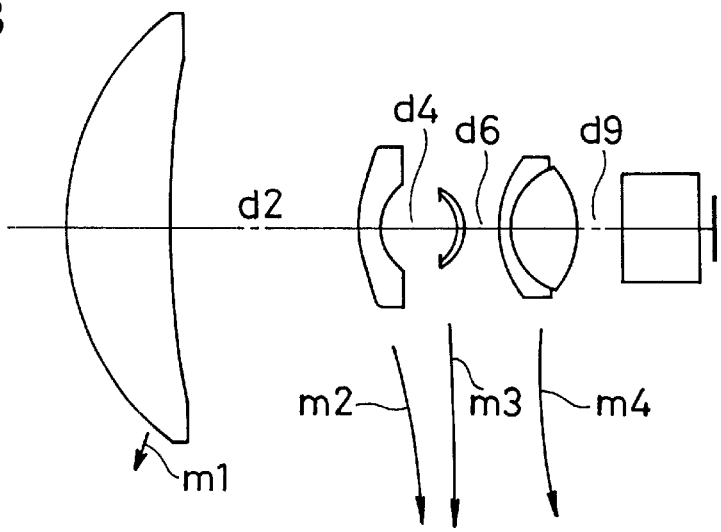
Figure 7C:
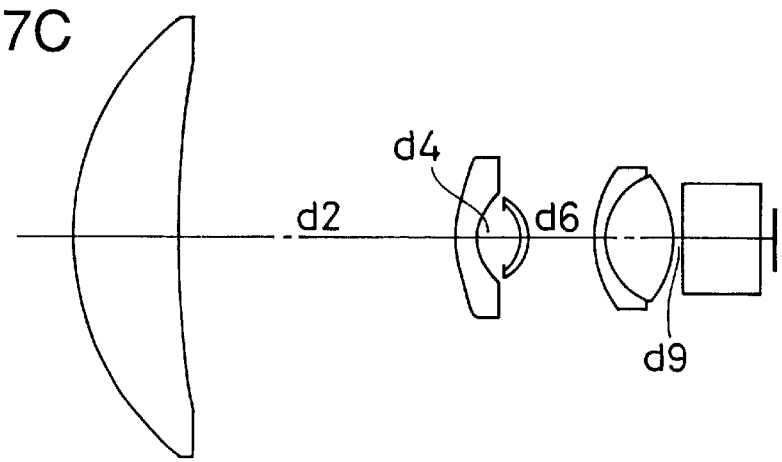

<First to Fourth Embodiments (FIGS. 1A to 1C, 3A to 3C, 5A to 5C, and 7A to 7C)>

FIGS. 1A to 1C, 3A to 3C, 5A to 5C, and 7A to 7C are lens arrangement diagrams of the zoom lens systems of a first to a fourth embodiment, respectively, of the present invention. Of these diagrams, FIGS. 1A, 3A, 5A, and 7A illustrate the lens arrangements of the respective zoom lens systems in the wide-angle-end condition, FIGS. 1B, 3B, 5B, and 7B illustrate the lens arrangements of the respective zoom lens systems in the middle-focal-length condition, and FIGS. 1C, 3C, 5C, and 7C illustrate the lens arrangements of the respective zoom lens systems in the telephoto-end condition. In each lens arrangement diagram, arrows m1 to m4 schematically show the movement of the first lens unit (Gr1) to the fourth lens unit (Gr4), respectively, during zooming from the wide-angle end to the middle-focal-length position, and from the middle-focal-length position to the telephoto end. Moreover, in each lens arrangement diagram, a surface marked with Si (i=1, 2, 3, . . . ) is the ith surface counted from the object side, a surface Si marked with an asterisk (*) is an aspherical surface, and a surface Si marked with # is a surface having a diffractive optical power. Furthermore, an axial distance marked with di (i=1, 2, 3, . . . ) is the ith axial distance counted from the object side, though only those axial distances between the lens units that vary with zooming (i.e. variable axial distances) are indicated here.

In the first and second embodiments, the first lens unit (Gr1) and the third lens unit (Gr3) are each composed of a single homogeneous lens element, and the second lens unit (Gr2) and the fourth lens unit (Gr4) are each composed of a single gradient-index lens element (GRIN1 and GRIN2). The first lens unit (Gr1) is composed of a positive meniscus lens element convex to the object side or a positive biconvex lens element. The second lens unit (Gr2) is composed of a negative meniscus lens element concave to the image side or a biconcave lens element (GRIN1). The third lens unit (Gr3) is composed of a positive meniscus lens element convex to the image side or a biconvex lens element. The fourth lens unit (Gr4) is composed of a positive lens element (GRIN2) having a concave surface on the object side or having a strongly-curved convex surface on the image side.

In the third and fourth embodiments, the first lens unit (Gr1) and the third lens unit (Gr3) are each composed of a single homogeneous lens element, the second lens unit (Gr2) is composed of a single gradient-index lens element (GRIN1), and the fourth lens unit (Gr4) is composed of a single bonded lens element. The first lens unit (Gr1) is composed of a positive meniscus lens element convex to the object side. The second lens unit (Gr2) is composed of a negative meniscus lens element (GRIN1) concave to the image side. The third lens unit (Gr3) is composed of a negative meniscus lens element having a strongly-curved convex surface on the image side. The fourth lens unit (Gr4) is composed of a bonded lens element consisting of a negative meniscus lens element convex to the object side and a positive biconvex lens element bonded together.

In all of these embodiments, a low-pass filter P is provided at the image-side end of the zoom lens system, and an aperture stop A is provided on the object side of the third lens unit.

<Features of First to Fourth Embodiments>

The first to fourth embodiments are designed to fulfill Condition (1) below. In a zoom lens system, like those of the first to fourth embodiments, composed of four lens units that are, from the object side, a first lens unit having a positive optical power (Gr1), a second lens unit having a negative optical power (Gr2), a third lens unit (Gr3), and a fourth lens unit (Gr4), it is preferable that Condition (1) be fulfilled.

$$0.4 < |\phi 2/\phi W| < 0.8 \tag{1}$$

where
  $\phi 2$ represents the optical power of the second lens unit (Gr2); and
  $\phi W$ represents the optical power of the entire zoom lens system at the wide-angle end.

If Condition (1) is fulfilled, it is possible to reduce the number of constituent lens elements of the second lens unit (Gr2), which is considered to be highly difficult to achieve in this type of zoom lens systems. If the upper limit of Condition (1) is exceeded, the optical power of the second lens unit (Gr2) is too strong, and thus it is difficult to reduce the number of constituent lens elements of the second lens unit. By contrast, if the lower limit of Condition (1) is exceeded, the optical power of the second lens unit (Gr2) is too weak, and thus the passing positions of off-axial rays become unduly high in the image-side lens units, particularly in the fourth lens unit (Gr4). This requires unduly large lens diameters and makes it difficult to ensure sufficient illuminance.

As described previously, in the first to fourth embodiments, the second lens unit (Gr2) and the fourth lens unit (Gr4) are each composed of a gradient-index lens element (GRIN1 and GRIN2) that fulfills Formula (GR) below. In a zoom lens system, like those of the first to fourth embodiments, composed of four lens units that are, from the object side, a first lens unit having a positive optical power (Gr1), a second lens unit having a negative optical power (Gr2), a third lens unit (Gr3), and a fourth lens unit (Gr4), it is preferable that at least one of the first to fourth lens units include a gradient-index lens element that fulfills Formula (GR) below. The use of such a gradient-index lens element makes flexible correction of aberrations possible, and thereby helps reduce the number of constituent lens elements of the entire zoom lens system.

$$N(r) = N0 + N1 \cdot r^2 + N2 \cdot r^4 + N3 \cdot r^6 + N4 \cdot r^8 + \ldots \tag{GR}$$

where
  r represents the height in a direction perpendicular to the optical axis;
  N(r) represents the refractive index at the height r (i.e. the index distribution);
  N0 represents the refractive index on the optical axis; and
  Ni represents the index distribution coefficient of the 2ith order (i=1, 2, 3, . . . ; r raised to the power of 2i), that is, N1 represents the index distribution coefficient of the second order, N2 represents the index distribution coefficient of the fourth order, N3 represents the index distribution coefficient of the sixth order, and N4 represents the index distribution coefficient of the eighth order, and so forth.

As described previously, in the first and second embodiments, each lens unit is composed of a single lens element, and the second lens unit (Gr2) and the fourth lens unit (Gr4) are each composed of a gradient-index lens element (GRIN1 and GRIN2). In a zoom lens system, like those of the first and second embodiments, composed of four lens units that are, from the object side, a first lens unit having a positive optical power (Gr1), a second lens unit having a negative optical power (Gr2), a third lens unit (Gr3), and a fourth lens unit (Gr4), wherein each lens unit is composed of a single lens element, it is preferable that at least the second lens unit (Gr2) and the fourth lens unit (Gr4) be each composed of a gradient-index lens element.

Incidentally, according to past research papers and the like, it has generally been believed that composing a single-focal-length lens by the use of a gradient-index lens element having spherical or plane surfaces imposes limitations on the flexibility with which third-order aberrations can be corrected, and therefore that, as long as proper correction of aberrations is desired, it is impossible to compose a single-focal-length lens by the use of a single gradient-index lens element (see. "Design of a gradient-index photographic objective" by L. G. Atkinson et al. Appl. Opt., Vol. 21, 1982, 993–998). The same is true of a zoom lens system. Specifically, if the lens units constituting a zoom lens system are each composed of a single lens element, it is impossible to correct aberrations properly, because then third-order aberrations cannot be corrected with sufficient flexibility. Thus, it is impossible to compose each of the constituent lens units of a zoom lens system by the use of a single gradient-index lens element. On the other hand, in a case where all of the constituent lens units of a zoom lens system are composed solely of homogeneous lens elements having aspherical or spherical surfaces, since aspherical surfaces do not have the ability to correct chromatic aberration and Petzval sum properly, it is necessary to use at least two lens elements (one positive lens element and one negative lens element) in each lens unit.

To solve this problem, in the first to fourth embodiments, the gradient-index lens elements (GRIN1 and GRIN2) are each provided with an aspherical surface at least on one side. By the use of a gradient-index lens element in the lens units constituting a zoom lens system, and by the use of an aspherical surface at least on one side of the gradient-index lens element, it is possible to obtain a large-aperture-ratio and high-magnification zoom lens system of which each lens unit is composed of a single lens element. Furthermore, this helps reduce the thickness of each lens unit and thereby make the entire zoom lens system compact.

In the first to fourth embodiments, the gradient-index lens elements (GRIN1 and GRIN2) fulfill Condition (2) shown below. To achieve satisfactory correction of Petzval sum, it is preferable to employ, as in the first to fourth embodiments, gradient-index lens elements that fulfill Condition (2).

$$0 < sgn[\phi G] \cdot N1/\phi G^2 < 10.0 \qquad (2)$$

where sgn[$\phi G$] represents a parameter whose value equals +1 when the optical power of the lens unit including the gradient-index lens element is negative and equals −1 when the optical power of the lens unit including the gradient-index lens element is positive;

N1 represents the index distribution coefficient of the second order of the gradient-index lens element; and $\phi G$ represents the optical power of the lens unit including the gradient-index lens element.

Condition (2) relates to the index distribution of a gradient-index lens element, and particularly defines the condition to be fulfilled to correct Petzval sum satisfactorily within a lens unit that includes a gradient-index lens element. If the upper or lower limit of Condition (2) is exceeded, it becomes difficult to correct Petzval sum by the use of the gradient-index lens element, and the index distribution coefficient becomes unduly large, making the manufacture of the gradient-index lens element difficult.

In the first to fourth embodiments, the zoom lens system is provided with a surface having a diffractive optical power (i.e. a surface having a diffraction grating as found in a diffractive optical element) which fulfills Formula (DS) shown below. In a zoom lens system, like those of the first to fourth embodiments, composed of four lens units that are, from the object side, a first lens unit having a positive optical power (Gr1), a second lens unit having a negative optical power (Gr2), a third lens unit (Gr3), and a fourth lens unit (Gr4), it is preferable to provide a surface having a diffractive optical power fulfilling Formula (DS).

$$\phi(H) = 2\pi \cdot \{\Sigma(Ri \cdot H^i)\}/\lambda 0 \qquad (DS)$$

where $\phi(H)$ represents the phase function;

H represents the height in a direction perpendicular to the optical axis;

Ri represents the phase coefficient of the ith order; and $\lambda 0$ represents the design wavelength.

The use of a surface having a diffractive optical power as defined above makes flexible correction of aberrations possible, and in addition, by the effect of the negative dispersion provided by the diffraction grating, makes it possible to correct chromatic aberrations properly with as few lens elements as possible. Thus, it is possible to minimize the number of constituent lens elements of the entire zoom lens system without sacrificing high optical performance. This can be achieved most effectively by providing a surface having a diffractive optical power at least on one surface of the gradient-index lens elements mentioned above. Accordingly, in the first, third, and fourth embodiments, a surface having a diffractive optical power is provided on the gradient-index lens element (GRIN1) included in the second lens unit (Gr2).

In the first to fourth embodiments, a diffractive optical element that fulfills Condition (3) below is used. To achieve satisfactory correction of chromatic aberration, it is preferable to employ, as in the first to fourth embodiments, a diffractive optical element that fulfills Condition (3).

$$0.02 < |\phi d/\phi| < 0.8 \qquad (3)$$

where $\phi d$ represents the optical power of the surface having a diffractive optical power; and $\phi$ represents the optical power of the lens unit which includes the surface having a diffractive optical power, where $\phi d$ and $\phi$ are defined respectively by Formulae (a) and (b) below.

$$\phi d = -2 \cdot m \cdot R2 \qquad (a)$$

$$\phi = \phi r + \phi d \qquad (b)$$

where m represents the order of diffraction;

R2 represents the phase coefficient of the second order; and $\phi r$ represents the composite optical power of the refractive optical system that constitutes the lens unit including the surface having a diffractive optical power (i.e. the sum of the optical power that the lens unit would exert if it were composed of a homogeneous lens element and the optical power of the medium of which the gradient-index lens element is made).

Condition (3) defines the optical power of the diffractive optical element. If the upper limit of Condition (3) is exceeded, the optical power of the diffractive optical element within the lens unit that includes it is too strong, and thus chromatic aberration is overcorrected by the diffractive optical element. By contrast, if the lower limit of Condition (3) is exceeded, the optical power of the diffractive optical element within the lens unit that includes it is too weak, and thus chromatic aberration is undercorrected.

In the first to fourth embodiments, the zoom lens system fulfills Condition (4) below. In a zoom lens system, like those of the first to fourth embodiments, composed of four lens units that are, from the object side, a first lens unit having a positive optical power (Gr1), a second lens unit having a negative optical power (Gr2), a third lens unit (Gr3), and a fourth lens unit (Gr4), it is preferable that Condition (4) be fulfilled.

$$0.1 < |\phi 1/\phi 2| < 0.4 \qquad (4)$$

where $\phi 1$ represents the optical power of the first lens unit (Gr1); and $\phi 2$ represents the optical power of the second lens unit (Gr2).

Condition (4) defines the condition to be fulfilled by the zoom solution in order to achieve well-balanced correction of aberrations in a compact large-aperture-ratio and high-magnification zoom lens system. If the upper limit of Condition (4) is exceeded, the optical power of the first lens unit (Gr1) is too strong relative to that of the second lens unit (Gr2), and the composite optical power of the first and second lens units (Gr1 and Gr2) at the wide-angle end and the composite optical power of the second to fourth lens units (Gr2 to Gr4) at the telephoto end are too weak. This makes the entire zoom lens system unduly large. By contrast, if the lower limit of Condition (4) is exceeded, the optical power of the second lens unit (Gr2) is too strong. This makes it difficult to correct aberrations properly.

<Features of the First lens unit (Gr1)>

In a case where the first lens unit (Gr1) is composed of a single lens element, the use of a gradient-index lens element makes the lens diameter unduly large. Additionally, a gradient-index lens element is not essential for proper correction of the Petzval sum of the lens unit. Thus, in a case where the first lens unit (Gr1) is composed of a single lens element, it is advisable to use a homogeneous lens element that has at least one surface having a diffractive optical power. This makes it possible to correct chromatic aberration satisfactorily within the first lens unit (Gr1).

It is preferable that the diffractive optical element employed in the first lens unit (Gr1) fulfill Condition (5) below.

$$0.02 < |\phi 1d/\phi 1| < 0.8 \qquad (5)$$

where $\phi 1d$ represents the optical power of the surface having a diffractive optical power provided in the first lens unit (Gr1); and $\phi 1$ represents the optical power of the first lens unit (Gr1), where $\phi 1d$ and $\phi 1$ are defined respectively by Formulae (c) and (d) below.

$$\phi 1d = -2 \cdot m \cdot R2 \qquad (c)$$

$$\phi 1 = \phi 1r + \phi 1d \qquad (d)$$

where m represents the order of diffraction;

R2 represents the phase coefficient of the second order; and $\phi 1r$ represents the composite optical power of the refractive optical system that constitutes the first lens unit (Gr1) (i.e. the sum of the optical power that the lens would exert if it were composed of a homogeneous lens element and the optical power of the medium of which the gradient-index lens element is made).

Condition (5) defines the optical power of the diffractive optical element. If the upper limit of Condition (5) is exceeded, the optical power of the diffractive optical element within the first lens unit (Gr1) is too strong, and thus chromatic aberration is overcorrected by the diffractive optical element. By contrast, if the lower limit of Condition (5) is exceeded, the optical power of the diffractive optical element within the first lens unit (Gr1) is too weak, and thus chromatic aberration is undercorrected.

In a case where the first lens unit (Gr1) is composed of a single lens element, it is preferable that it be composed of a positive lens element having a highly convex surface on the object side or a positive meniscus lens element convex to the object side. This makes it possible to satisfactorily reduce the spherical aberration and coma aberration that occur in the first lens unit (Gr1). A lens element having such a shape is preferable for the correction of, in particular, the spherical aberration and coma aberration occurring at the telephoto end. Moreover, a lens element having such a shape helps place the rear principal point of the first lens unit (Gr1) in front of the first lens unit (Gr1) and thereby reduce the total length of the zoom lens system.

In a case where the first lens unit (Gr1) is composed of a single lens element, it is preferable that the lens element fulfill Condition (6) below.

$$0.0 < (R12+R11)/(R12-R11) < 5.0 \qquad (6)$$

where

R11 represents the radius of curvature of the object-side surface of the first lens unit (Gr1); and R12 represents the radius of curvature of the image-side surface of the first lens unit (Gr1).

Condition (6) defines, for a case where a gradient-index lens element is included in the first lens unit (Gr1), the shape of the gradient-index lens element. If the upper limit of Condition (6) is exceeded, spherical aberration, in particular, inconveniently appears toward the positive side. By contrast, if the lower limit of Condition (6) is exceeded, spherical aberration inconveniently appears toward the negative side.

In a case where the first lens unit (Gr1) includes a lens element having an aspherical surface, it is preferable that the aspherical surface fulfill Condition (7) below, assuming that 0<H< Hmax.

$$-2.0 < (\phi a - \phi 0a)/\phi 1 < 2.0 \qquad (7)$$

where

H represents the height in the direction of a radius of the lens element;

Hmax represents the effective radius of the lens element;

$\phi a$ represents the local optical power of the aspherical surface;

$\phi 0a$ represents the optical power of the aspherical surface resulting from its nominal curvature; and $\phi 1$ represents the optical power of the first lens unit (Gr1), where $\phi a$ and $\phi 0a$ are defined respectively by Formulae (e) and (f) below.

$$\phi a = Calo \{N(H)' - N(H)\} \qquad (e)$$

$$\phi 0a = C0 (N0' - N0) \qquad (f)$$

where

Calo represents the local curvature of the aspherical surface at a specific height H;

C0 represents the nominal curvature of the aspherical surface;

N(H)' represents the refractive index of the image-side medium of the aspherical surface at a specific height H;

N(H) represents the refractive index of the object-side medium of the aspherical surface at a specific height H;

N0' represents the refractive index of the image-side medium of the aspherical surface on the optical axis; and N0 represents the refractive index of the object-side medium of the aspherical surface on the optical axis.

Condition (7) defines, for a case where an aspherical surface is included in the first lens unit (Gr1), the condition to be fulfilled by the aspherical surface. If the upper limit of Condition (7) is exceeded, the aberrations produced by the spherical surfaces within the first lens unit (Gr1) are inconveniently amplified by the aspherical surface. By contrast, if the lower limit of Condition (7) is exceeded, the aberrations are overcorrected by the aspherical surface. In this case, for instance, even if one or more aspherical surfaces are used additionally, it is difficult to cancel such overcorrection of aberrations satisfactorily by the use of the added aspherical surfaces.

<Features of the Second lens unit (Gr2)>

In a zoom lens system, like those of the first to fourth embodiments, composed of four lens units that are, from the object side, a first lens unit having a positive optical power (Gr1), a second lens unit having a negative optical power (Gr2), a third lens unit (Gr3), and a fourth lens unit (Gr4), it is preferable that the second lens unit (Gr2) include a gradient-index lens element. This helps reduce the number of constituent lens elements of the second lens unit (Gr2).

In a zoom lens system composed of four lens units that are, from the object side, a first lens unit having a positive optical power, a second lens unit having a negative optical power, a third lens unit, and a fourth lens unit, when the second lens unit is composed solely of homogeneous lens elements, and if only one negative lens element is included in the second lens unit; it is difficult to satisfactorily suppress the increase in the negative direction of the Petzval sum of the second lens unit within this lens unit itself. Thus, at least two negative lens elements are required and besides at least one positive lens element is required to correct chromatic aberration. Therefore, at least three lens elements are necessary in total in the second lens unit. As described above, in conventional zoom lens systems, a large number of constituent lens elements are required in the second lens unit. Accordingly, reducing the number of constituent lens elements of the second lens unit significantly contributes to the reduction of the number of constituent lens elements of the entire zoom lens system. From this point of view, it is preferable to use in the second lens unit a gradient-index lens element which fulfills Formula (GR) noted previously. The use of a gradient-index lens element in the second unit is effective in reducing the number of constituent lens elements of the entire zoom lens system.

In the above zoom lens system composed of four lens units, since the optical power of the second lens unit is strong, it is extremely difficult, by the use of a gradient-index lens element having spherical or plane surfaces, to ensure high optical performance and simultaneously minimize the number of constituent lens elements. To solve this problem, in a zoom lens system, like those of the first to fourth embodiments, that is composed of four lens units that are, from the object side, a first lens unit having a positive optical power (Gr1), a second lens unit having a negative optical power (Gr2), a third lens unit (Gr3), and a fourth lens unit (Gr4), it is preferable to use in the second lens unit (Gr2) a gradient-index lens element which fulfills Formula (GR), and to use an aspherical surface at least on one surface in the second lens unit (Gr2). This makes it possible to compose the second lens unit (Gr2) of a single lens element.

Furthermore, in a zoom lens system, like those of the first to fourth embodiments, that is composed of four lens units that are, from the object side, a first lens unit having a positive optical power (Gr1), a second lens unit having a negative optical power (Gr2), a third lens unit (Gr3), and a fourth lens unit (Gr4), it is preferable to use at least one surface having a diffractive optical power in the second lens unit (Gr2). This helps reduce the number of constituent lens elements of the second lens unit (Gr2). In addition, in a case where the second lens unit (Gr2) is composed of a single gradient-index lens element, it is possible to exploit the negative dispersion provided by the diffraction grating to make the dispersion of the gradient-index lens element positive. This makes the manufacture of the gradient-index lens element relatively easy.

It is preferable that the second lens unit (Gr2) include a gradient-index lens element which fulfills Condition (8) below.

$$-5.0 < N1d2/\phi2^2 < 10.0 \qquad (8)$$

where

N1d2 represents the index distribution coefficient of the second order for d-line of the gradient-index lens element included in the second lens unit (Gr2); and $\phi2$ represents the optical power of the second lens unit (Gr2).

Condition (8) relates to the index distribution of the gradient-index lens element included in the second lens unit (Gr2), and particularly defines the condition to be fulfilled to correct Petzval sum satisfactorily within the second lens unit (Gr2). If the lower limit of Condition (8) is exceeded, the Petzval sum of the second lens unit (Gr2) unduly increases in the negative direction. By contrast, if the upper limit of Condition (8) is exceeded, the Petzval sum is overcorrected by the gradient-index lens element, and the index distribution becomes unduly large, which makes the manufacture of the gradient-index lens element difficult.

In a case where the second lens unit (Gr2) is composed of a single gradient-index lens element, the dispersion of the index distribution becomes negative (i.e. v1<0). This makes the manufacture of the gradient-index lens element extremely difficult. If the gradient-index lens element includes a surface having a diffractive optical power (a surface having a diffraction grating), the negative dispersion provided by the diffraction grating makes it possible to correct both longitudinal chromatic aberration and lateral chromatic aberration. At this time, if overcorrection of chromatic aberration resulting from the negative dispersion can be compensated for by the index distribution, it is possible to shift the dispersion of the index distribution in a direction in which positive chromatic aberration occurs (i.e. v1>0), or in a direction in which the index distribution becomes weakly negative (i.e. v1 takes a large negative value). By so doing, it is possible to make the gradient-index lens element have such index distribution that makes its manufacture easier than in the case where chromatic aberration is corrected solely by the gradient-index lens element (i.e. v1 takes a small negative value). Furthermore, by providing a surface having a diffractive optical power on both sides of the gradient-index lens element, it is possible, while keeping the index distribution such that the manufacture of this lens element is easy, to distribute the required power of diffraction between the two sides. Thus, it is possible, while achieving proper correction of chromatic aberration, to obtain index distribution and a diffraction grating as desired.

Note that v1 mentioned above is defined by Formula (g) below.

$$v1 = N1d/(N1f - N1C) \qquad (g)$$

where

N1d represents the index distribution coefficient of the second order for d-line;

N1f represents the index distribution coefficient of the second order for f-line; and N1C represents the index distribution coefficient of the second order for C-line.

In a case where the second lens unit (Gr2) includes a gradient-index lens element, it is preferable that the gradient-index lens element fulfill Condition (9) below, assuming that 0<H< Hmax.

$$-0.5 < \text{sgn}[N1] \cdot \{vd(H)-vd(0)\}/vd(0) < 2.0 \qquad (9)$$

where

H represents the height in the direction of a radius of the lens element;

Hmax represents the effective radius of the lens element;

sgn[N1] represents a parameter whose value equals +1 when the index distribution coefficient Ni of the second order is negative and equals −1 when the index distribution coefficient Ni of the second order is positive; and vd(H) represents the dispersion at the height H in a direction perpendicular to the optical axis within the gradient-index lens element, where vd(H) is defined by Formula (h) below.

$$vd(H) = \{Nd(H)-1\}/\{NF(H)-NC(H)\} \qquad (h)$$

where

Nd(H) represents the refractive index for d-line at the height H;

NF(H) represents the refractive index for F-line at the height H; and

NC(H) represents the refractive index for C-line at the height H.

In a case where the second lens unit (Gr2) includes a gradient-index lens element, it is preferable that the gradient-index lens element fulfill Conditions (10A) and (10B) below.

$$-0.1 < (N1F2-N1d2)/\phi 2G^2 < 0.1 \qquad (10A)$$

$$-0.1 < (N1C2-N1d2)/\phi 2G^2 < 0.1 \qquad (10B)$$

where

N1d2 represents the index distribution coefficient of the second order for d-line of the gradient-index lens element included in the second lens unit (Gr2);

N1F2 represents the index distribution coefficient of the second order for F-line of the gradient-index lens element included in the second lens unit (Gr2);

N1C2 represents the index distribution coefficient of the second order for C-line of the gradient-index lens element included in the second lens unit (Gr2); and φ2G represents the optical power of the gradient-index lens element included in the second lens unit (Gr2).

In a case where the second lens unit (Gr2) includes a gradient-index lens element, it is preferable that the gradient-index lens element fulfill Condition (11) below.

$$|N2d2/\phi 2^4| < 100 \qquad (11)$$

where

N2d2 represents the index distribution coefficient of the fourth order for d-line of the gradient-index lens element included in the second unit (Gr2); and φ2 represents the optical power of the second lens unit (Gr2).

In a case where the second lens unit (Gr2) includes a gradient-index lens element, the gradient-index lens element corrects not only various aberrations (particularly Petzval sum) but also chromatic aberration. Conditions (9) to (11) define, for a case where the second lens unit (Gr2) includes a gradient-index lens element, the conditions to be fulfilled by the gradient-index lens element in terms of the dispersion and the index distribution coefficient. If any of the limits of Conditions (9), (10A), and (10B) is exceeded, the chromatic aberration occurring within the second lens unit (Gr2) makes it extremely difficult to correct the chromatic aberration of the entire zoom lens system properly. On the other hand, if either of the limits of Condition (11) is exceeded, the index distribution becomes unduly large. This makes the manufacture of the gradient-index lens element difficult, and in addition causes high-order aberrations and thus makes proper correction of aberrations difficult.

In a case where the second lens unit (Gr2) includes a gradient-index lens element, it is preferable that the gradient-index lens element fulfill Condition (12) below.

$$0.3 < \phi 2GM/\phi 2GS < 3.0 \qquad (12)$$

where

φ2GS represents the optical power of the surfaces of the gradient-index lens element included in the second lens unit (Gr2); and φ2GM represents the optical power of the medium of the gradient-index lens element included in the second lens unit (Gr2).

In Condition (12), φ2GS and φ2GM are defined by Formula (i) below, assuming that φ2G represents the optical power of the gradient-index lens element included in the second lens unit (Gr2). In addition, if the gradient-index lens element is assumed to be a homogeneous lens element, its optical power (in this case, the refractive index on the optical axis of the lens element is considered) equals φ2GS and the optical power that results from the index distribution of the medium itself of the lens element equals φ2GM. Hence, +2GM is defined by Formula (j) below.

$$\phi 2G = \phi 2GS + \phi 2GM \qquad (i)$$

$$\phi 2GM = -2 \cdot N1d2 \cdot T2G \qquad (j)$$

where

N1d2 represents the index distribution coefficient of the second order for d-line of the gradient-index lens element included in the second lens unit (Gr2); and T2G represents the axial thickness of the gradient-index lens element included in the second lens unit (Gr2).

Condition (12) defines, for a case where the second lens unit (Gr2) includes a gradient-index lens element, the condition to be fulfilled by the gradient-index lens element. If the upper limit of Condition (12) is exceeded, the index distribution becomes unduly large. This makes the manufacture of the gradient-index lens element difficult, and in addition causes high-order aberrations. In contrast, if the lower limit of Condition (12) is exceeded, the index distribution becomes too small. This makes it difficult to correct Petzval sum properly, and reduces the effect of aberration correction brought about by the index distribution, and thus makes proper correction of aberrations difficult.

It is preferable that the second lens unit (Gr2) include a diffractive optical element which fulfills Condition (13) below.

$$0.02 < |\phi 2d/\phi 2| < 0.8 \qquad (13)$$

where

φ2d represents the optical power of the surface having a diffractive optical power provided in the second lens unit (Gr2); and φ2 represents the optical power of the second lens unit (Gr2);

where φ2d and φ2 are defined respectively by Formulae (k) and (l) below.

$$\phi 2d = -2 \cdot m \cdot R2 \quad (k)$$

$$\phi 2 = \phi 2r + \phi 2d \quad (l)$$

where m represents the order of diffraction;

R2 represents the phase coefficient of the second order; and

φ2r represents the composite optical power of the refractive optical system that constitutes the second lens unit (Gr2) (i.e. the sum of the optical power that the lens would exert if it were composed of a homogeneous lens element and the optical power of the medium of which the gradient-index lens element is made).

Condition (13) defines the optical power of the diffractive optical element. If the upper limit of Condition (13) is exceeded, the optical power of the diffractive optical element within the second lens unit (Gr2) is too strong, and thus chromatic aberration is overcorrected by the diffractive optical element. By contrast, if the lower limit of Condition (13) is exceeded, the optical power of the diffractive optical element within the second lens unit (Gr2) is too weak, and thus chromatic aberration is undercorrected.

In a case where the second lens unit (Gr2) includes a gradient-index lens element, it is preferable that the gradient-index lens element fulfill Condition (14) below.

$$-5.0 < (R22 + R21)/(R22 - R21) < 0.0 \quad (14)$$

where

R21 represents the radius of curvature of the object-side surface of the second lens unit (Gr2); and R22 represents the radius of curvature of the image-side surface of the second lens unit (Gr2).

Condition (14) defines, for a case where the second lens unit (Gr2) includes a gradient-index lens element, the shape of the gradient-index lens element. If the upper limit of Condition (14) is exceeded, spherical aberration, in particular, inconveniently appears toward the negative side. By contrast, if the lower limit of Condition (14) is exceeded, spherical aberration inconveniently appears toward the positive side. Furthermore, if either of the limits of Conditions (14) is exceeded, coma aberration becomes unduly large.

In a case where the second lens unit (Gr2) is composed of a single gradient-index lens element, it is preferable that it be composed of a negative lens element having a highly concave surface on the image side or a negative meniscus lens element concave to the image side. This allows, in particular, the positive distortion that occurs at the wide-angle end in the first lens unit (Gr1) and the spherical aberration that occurs at the telephoto end in the first lens unit (Gr1) to be corrected properly by the second lens unit (Gr2).

In a case where the second lens unit (Gr2) that is composed of a single lens element is provided with a surface having a diffractive optical power, it is preferable that the surface having a diffractive optical power be disposed on the image side of that lens element. This makes it possible to obtain higher diffraction efficiency, because, on the image side of the lens element, the angle (i.e. the angle of incidence) at which off-axial light beams enter the lens element is smaller.

It is preferable that the second lens unit (Gr2) include a lens element having an aspherical surface. By the use of at least one aspherical surface in the second lens unit (Gr2), it is possible to increase the flexibility with which aberrations can be corrected, and thus achieve a high-magnification and large-aperture-ratio zoom lens system in which the second lens unit (Gr2) is composed of at least one lens element.

In a case where the second lens unit (Gr2) includes a lens element having an aspherical surface, it is preferable that the aspherical surface fulfill Condition (15) below, assuming that 0<H< Hmax.

$$-6.0 < (\phi a - \phi 0a)/\phi 2 < 5.0 \quad (15)$$

where

H represents the height in the direction of a radius of the lens element;

Hmax represents the effective radius of the lens element;

φa represents the local optical power of the aspherical surface;

φ0a represents the optical power of the aspherical surface resulting from its nominal curvature; and φ2 represents the optical power of the second lens unit (Gr2);

where φa and φ0a are defined respectively by Formulae (e) and (f) below.

$$\phi a = C a l o \{N(H)' - N(H)\} \quad (e)$$

$$\phi 0a = C 0 (N0' - N0) \quad (f)$$

where

Calo represents the local curvature of the aspherical surface at a specific height H;

C0 represents the nominal curvature of the aspherical surface;

N(H)' represents the refractive index of the image-side medium of the aspherical surface at a specific height H;

N(H) represents the refractive index of the object-side medium of the aspherical surface at a specific height H;

N0' represents the refractive index of the image-side medium of the aspherical surface on the optical axis; and N0 represents the refractive index of the object-side medium of the aspherical surface on the optical axis.

Condition (15) defines, for a case where the second lens unit (Gr2) includes an aspherical surface, the condition to be fulfilled by the aspherical surface. If the upper limit of Condition (15) is exceeded, the negative aberrations caused by the spherical surfaces of the second lens unit (Gr2) are inconveniently amplified by the aspherical surface. By contrast, if the lower limit of Condition (15) is exceeded, the aberrations are overcorrected by the aspherical surface. In this case, for instance, even if one or more aspherical surfaces are used additionally, it is difficult to cancel such overcorrection satisfactorily by the use of the added aspherical surfaces.

In a case where the second lens unit (Gr2) includes a lens element having an aspherical surface, it is preferable that the lens element have aspherical surfaces on both sides. The use of such a lens element increases the total number of aspherical surfaces and thus the flexibility with which aberrations can be corrected, and thereby makes it possible to achieve more effective correction of aberrations.

<Features of the Third lens unit (Gr3)>

It is preferable that the third lens unit (Gr3) include a lens element having an aspherical surface. By the use of at least one aspherical surface in the third lens unit (Gr3), it is possible to increase the flexibility with which aberrations can be corrected, and thereby obtain a large-aperture-ratio and high-magnification zoom lens system in which the third lens unit (Gr3) is composed of at least one lens element.

In a case where the third lens unit (Gr3) includes a lens element having an aspherical surface, it is preferable that the aspherical surface fulfill Condition (16) below, assuming that 0<H< Hmax.

$$0<(\phi a-\phi 0a)/\phi 3<8 \tag{16}$$

where

H represents the height in the direction of a radius of the lens element;

Hmax represents the effective radius of the lens element;

φa represents the local optical power of the aspherical surface;

φ0a represents the optical power of the aspherical surface resulting from its nominal curvature; and φ3 represents the optical power of the third lens unit (Gr3), where φa and φ0a are defined respectively by Formulae (e) and (f) below.

$$\phi a\ Calo\ \{N(H)'-N(H)\} \tag{e}$$

$$\phi 0a\ C0\ (N0'-N0) \tag{f}$$

where

Calo represents the local curvature of the aspherical surface at a specific height H;

C0 represents the nominal curvature of the aspherical surface;

N(H)' represents the refractive index of the image-side medium of the aspherical surface at a specific height H;

N(H) represents the refractive index of the object-side medium of the aspherical surface at a specific height H;

N0' represents the refractive index of the image-side medium of the aspherical surface on the optical axis; and N0 represents the refractive index of the object-side medium of the aspherical surface on the optical axis.

Condition (16) defines, for a case where the third lens unit (Gr3) includes an aspherical surface, the condition to be fulfilled by the aspherical surface. If the upper limit of Condition (16) is exceeded, the aberrations produced by the spherical surfaces of the third lens unit (Gr3) are inconveniently amplified by the aspherical surface. By contrast, if the lower limit of Condition (16) is exceeded, the aberrations are overcorrected by the aspherical surface. In this case, for instance, even if one or more aspherical surfaces are used additionally, it is difficult to cancel such overcorrection of aberrations satisfactorily by the use of the added aspherical surfaces.

In a case where the third lens unit (Gr3) includes a lens element having an aspherical surface, it is preferable that the lens element have aspherical surfaces on both sides. The use of such a lens element increases the total number of aspherical surfaces and thus the flexibility with which aberrations can be corrected, and thereby makes it possible to achieve more effective correction of aberrations.

<Features of the Fourth lens unit (Gr4)>

In a case where the fourth lens unit (Gr4) includes a gradient-index lens element, it is preferable that the gradient-index lens element fulfill Condition (17) below, assuming that 0<H< Hmax.

$$-1.0<sgn[N1]\cdot\{vd(H)-vd(0)\}/vd(0)<2.0 \tag{17}$$

where

H represents the height in the direction of a radius of the lens element;

Hmax represents the effective radius of the lens element;

sgn[N1] represents a parameter whose value equals +1 when the index distribution coefficient N1 of the second order is negative and equals −1 when the index distribution coefficient N1 of the second order is positive; and vd(H) represents the dispersion at the height H in a direction perpendicular to the optical axis within the gradient-index lens element, where vd(H) is defined by Formula (h) below.

$$vd\ (H)=\{Nd\ (H)-1\}/\{NF\ (H)-NC\ (H)\} \tag{h}$$

where

Nd(H) represents the refractive index for d-line at the height H;

NF(H) represents the refractive index for F-line at the height H; and

NC(H) represents the refractive index for C-line at the height H.

In a case where the fourth lens unit (Gr4) includes a gradient-index lens element, it is preferable that the gradient-index lens element fulfill Conditions (18A) and (18B) below.

$$-0.1<(N1F4-N1d4)/\phi 4G^2<0.1 \tag{18A}$$

$$-0.1<(N1C4-N1d4)/\phi 4G^2<0.1 \tag{18B}$$

where

N1d4 represents the index distribution coefficient of the second order for d-line of the gradient-index lens element included in the fourth lens unit (Gr4);

N1F4 represents the index distribution coefficient of the second order for F-line of the gradient-index lens element included in the fourth lens unit (Gr4);

N1C4 represents the index distribution coefficient of the second order for C-line of the gradient-index lens element included in the fourth lens unit (Gr4); and φ4G represents the optical power of the gradient-index lens element included in the fourth lens unit (Gr4).

In a case where the fourth lens unit (Gr4) includes a gradient-index lens element, it is preferable that the gradient-index lens element fulfill Condition (19) below.

$$-10.0<N1d4/\phi 4^2<5.0 \tag{19}$$

where

N1d4 represents the index distribution coefficient of the second order for d-line of the gradient-index lens element included in the fourth lens unit (Gr4); and φ4 represents the optical power of the fourth lens unit (Gr4).

In a case where the fourth lens unit (Gr4) includes a gradient-index lens element, it is preferable that the gradient-index lens element fulfill Condition (20) below.

$$|N2d4/\phi 4^4|<100 \tag{20}$$

where

N2d4 represents the index distribution coefficient of the fourth order for d-line of the gradient-index lens element included in the fourth lens unit (Gr4); and φ4 represents the optical power of the fourth lens unit (Gr4).

In a case where the fourth lens unit (Gr4) includes a gradient-index lens element, the gradient-index lens element corrects not only various aberrations (particularly, high-order aberrations) but also chromatic aberration. Conditions (17) to (20) define, for a case where the fourth lens unit (Gr4) includes a gradient-index lens element, the conditions to be fulfilled by the gradient-index lens element in terms of the dispersion and the index distribution coefficient. If any of the limits of Conditions (17), (18A), and (18B) is exceeded, the chromatic aberration occurring within the fourth lens unit (Gr4) makes it extremely difficult to correct the chromatic aberration of the entire zoom lens system properly. On the other hand, if any of the limits of Conditions (19) and (20) is exceeded, the index distribution becomes unduly large. This makes the manufacture of the gradient-index lens element difficult, and in addition causes high-order aberrations and thus makes proper correction of aberrations difficult.

In a case where the fourth lens unit (Gr4) includes a gradient-index lens element, it is preferable that the gradient-index lens element fulfill Condition (21) below.

$$-80 < \phi 4GM/\phi 4GS < 80 \qquad (21)$$

where

φ4GS represents the optical power of the surfaces of the gradient-index lens element included in the fourth lens unit (Gr4); and φ4GM represents the optical power of the medium of the gradient-index lens element included in the fourth lens unit (Gr4).

In Condition (21), φ4GS and φ4GM are defined by Formula (m) below, assuming that φ4G represents the optical power of the gradient-index lens element included in the fourth lens unit (Gr4). In addition, if the gradient-index lens element is assumed to be a homogeneous lens element, its optical power (in this case, the refractive index on the optical axis of the lens element is considered) equals φ4GS and the optical power that results from the index distribution of the medium itself of the lens element equals φ4GM. Hence, φ4GM is defined by Formula (n) below.

$$\phi 4G = \phi 4GS + \phi 4GM \qquad (m)$$

$$\phi 4GM = -2 \cdot N1d4 \cdot T4G \qquad (n)$$

where

N1d4 represents the index distribution coefficient of the second order for d-line of the gradient-index lens element included in the fourth lens unit (Gr4); and T4G represents the axial thickness of the gradient-index lens element included in the fourth lens unit (Gr4).

Condition (21) defines, for a case where a gradient-index lens element is included in the fourth lens unit (Gr4), the condition to be fulfilled by the gradient-index lens element. If the upper limit of Condition (21) is exceeded, the index distribution becomes too large. This makes the manufacture of the gradient-index lens element difficult, and in addition causes high-order aberrations. In contrast, if the lower limit of Condition (21) is exceeded, the negative optical power resulting from the index distribution becomes too large, and thus the optical power of the surfaces become excessively large in the positive direction. This makes proper correction of Petzval sum and various aberrations (particularly, high-order aberrations) difficult.

In a case where the fourth lens unit (Gr4) includes a gradient-index lens element, it is preferable that the gradient-index lens element fulfill Condition (22) below.

$$-40 < (R42+R41)/(R42-R41) < 40 \qquad (22)$$

where

R41 represents the radius of curvature of the object-side surface of the fourth lens unit (Gr4); and R42 represents the radius of curvature of the image-side surface of the fourth lens unit (Gr4).

Condition (22) defines, for a case where a gradient-index lens element is included in the fourth lens unit (Gr4), the shape of the gradient-index lens element. If the upper limit of Condition (22) is exceeded, spherical aberration, in particular, inconveniently appears toward the positive side. By contrast, if the lower limit of Condition (22) is exceeded, spherical aberration inconveniently appears toward the negative side. Furthermore, if either of the limits of Conditions (22) is exceeded, coma aberration becomes unduly large.

In a case where the fourth lens unit (Gr4) is composed of a single gradient-index lens element, it is preferable that it be composed of a positive lens element having a highly convex surface on the object side. This makes it possible to satisfactorily correct various aberrations (particularly, spherical aberration).

It is preferable that the fourth lens unit (Gr4) include a lens element having an aspherical surface. By the use of at least one aspherical surface in the fourth lens unit (Gr4), it is possible to increase the flexibility with which aberrations can be corrected, and thus achieve a high-magnification and large-aperture-ratio zoom lens system in which the fourth lens unit (Gr4) is composed of at least one lens element.

In a case where the fourth lens unit (Gr4) includes a lens element having an aspherical surface, it is preferable that the aspherical surface fulfill Condition (23) below, assuming that 0<H< Hmax.

$$-20.0 < (\phi a - \phi 0a)/\phi 4 < 10.0 \qquad (23)$$

where

H represents the height in the direction of a radius of the lens element;

Hmax represents the effective radius of the lens element;

φa represents the local optical power of the aspherical surface;

φ0a represents the optical power of the aspherical surface resulting from its nominal curvature; and φ4 represents the optical power of the fourth lens unit (Gr4), where φa and φ0a are defined respectively by Formulae (e) and (f).

$$\phi a = Calo \{N(H)' - N(H)\} \qquad (e)$$

$$\phi a = C0 (N0' - N0) \qquad (f)$$

where

Calo represents the local curvature of the aspherical surface at a specific height H;

C0 represents the nominal curvature of the aspherical surface;

N(H)' represents the refractive index of the image-side medium of the aspherical surface at a specific height H;

N(H) represents the refractive index of the object-side medium of the aspherical surface at a specific height H;

N0' represents the refractive index of the image-side medium of the aspherical surface on the optical axis; and N0 represents the refractive index of the object-side medium of the aspherical surface on the optical axis.

Condition (23) defines, for a case where an aspherical surface is included in the fourth lens unit (Gr4), the condition to be fulfilled by the aspherical surface. If the upper limit of Condition (23) is exceeded, the aberrations produced by the spherical surfaces of the fourth lens unit (Gr4) are inconveniently amplified by the aspherical surface. By contrast, if the lower limit of Condition (23) is exceeded, the aberrations are overcorrected by the aspherical surface. In this case, for instance, even if one or more aspherical surfaces are used additionally, it is difficult to cancel such overcorrection of aberrations satisfactorily by the use of the added aspherical surfaces.

EXAMPLES

Hereinafter, examples of zoom lens systems embodying the present invention will be presented with reference to their construction data, graphic representations of aberrations, and other data. Tables 1 to 4 list the construction data of Examples 1 to 4, which respectively correspond to the first to fourth embodiments described above and have lens arrangements as shown in FIGS. 1A to 1C, 3A to 3C, 5A to 5C, and 7A to 7C.

In the construction data of each embodiment, Si (i=1, 2, 3, . . . ) represents the ith surface counted from the object side, ri (i=1, 2, 3, . . . ) represents the radius of curvature of the surface Si, di (i=1, 2, 3, . . . ) represents the ith axial distance counted from the object side, and Ndi (i=1, 2, 3, . . . ) and vdi (i=1, 2, 3, . . . ) respectively represent the refractive index and the Abbe number for d-line of the ith homogeneous lens element counted from the object side. Moreover, in the construction data, for each of the axial distances that vary with zooming (i.e. the variable axial distances), three values are given that are, from left, the axial aerial distance between the lens units at the wide-angle end (i.e. in the shortest focal length condition), the same distance at the middle-focal-length, and the same distance at the telephoto end (i.e. in the longest focal length condition). Also listed are the focal lengths f and the F-numbers FNO of the entire zoom lens system in those three focal-length conditions, and. Tables 5 to 24 list, for each embodiment, the values corresponding to the relevant conditions.

In the construction data, a surface Si marked with an asterisk (*) is an aspherical surface, whose surface shape is defined by Formula (AS) below. A surface Si marked with # is a surface having a diffractive optical power, of which the phase shape of the pitch is defined by Formula (DS) noted earlier. The gradient-index lens elements (GRIN1 and GRIN2) are defined by Formula (GR) noted earlier. Their index distribution coefficient Ni (Nid, Nic, and Nif; i=1, 2, 3, . . . ) corresponds to the index distribution coefficient of the 2ith order defined by Formula (GR). Also listed together with the construction data are the aspherical coefficients of each aspherical surface, the phase coefficients of each surface having a diffractive optical power, and the index distribution coefficients of each gradient-index lens element.

$$X(H) = (C \cdot H^2) / \{1 + (1 - \epsilon \cdot C^2 \cdot H^2)^{1/2}\} + \sum_i (Ai \cdot H^i) \quad \text{(AS)}$$

where

H represents the height in a direction perpendicular to the optical axis;

X(H) represents the displacement along the optical axis at the height H (relative to the vertex);

C represents the paraxial curvature;

$\epsilon$ represents the quadric surface parameter; and

Ai represents the aspherical coefficient of the ith order.

Figure 2A:
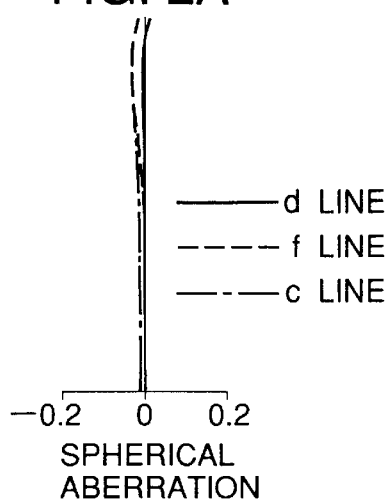
FIGS. 2A to 2I are graphic representations of aberrations observed in the zoom lens system of the first embodiment.
Figure 2B:
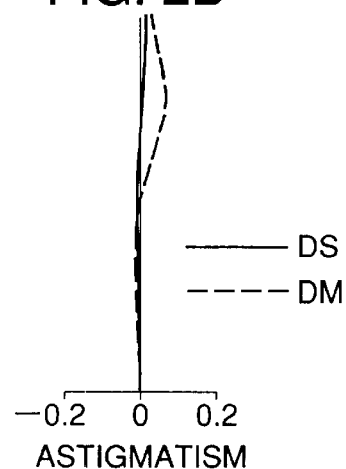
Figure 2C:
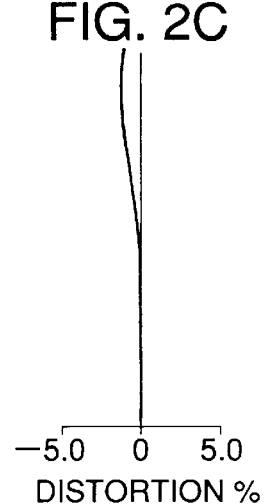
Figure 2D:
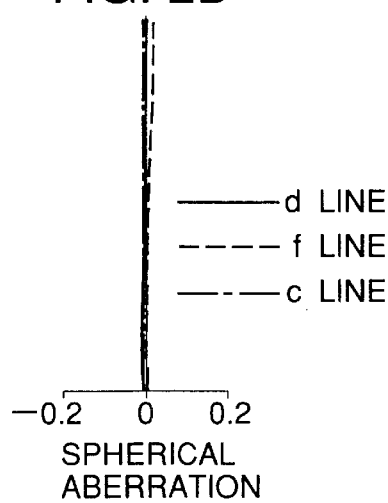
Figure 2E:
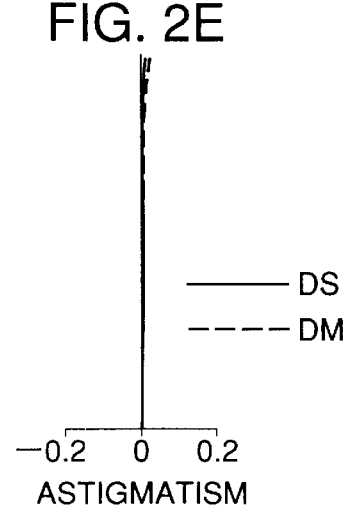
Figure 2F:
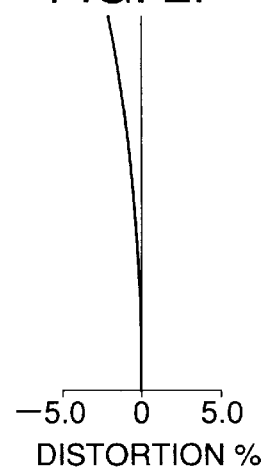
Figure 2G:
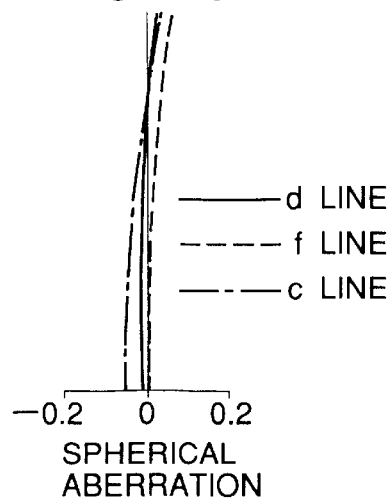
Figure 2H:
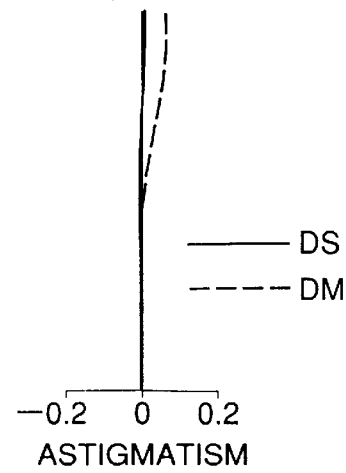
Figure 2I:
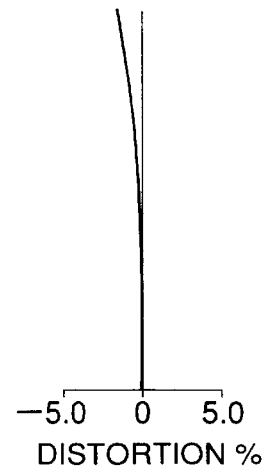
Figure 4A:
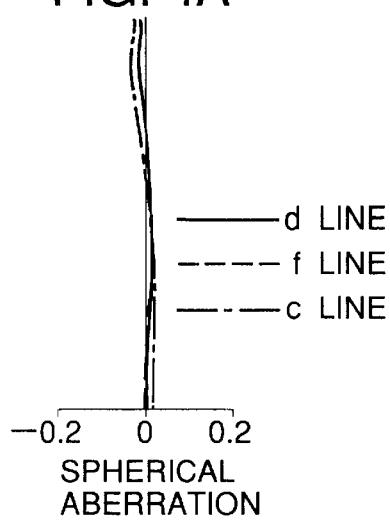
FIGS. 4A to 4I are graphic representations of aberrations observed in the zoom lens system of the second embodiment.
Figure 4B:
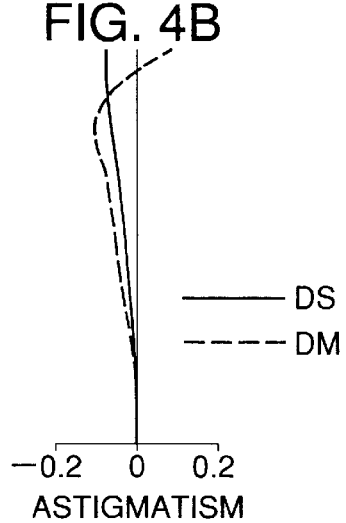
Figure 4C:
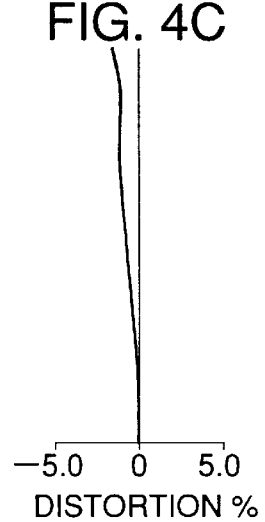
Figure 4D:
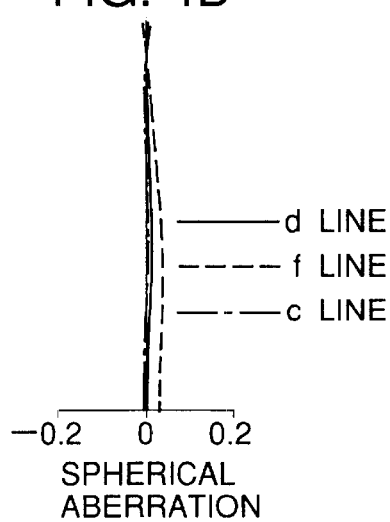
Figure 4E:
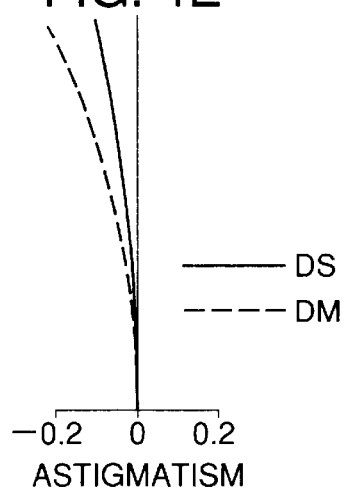
Figure 4F:
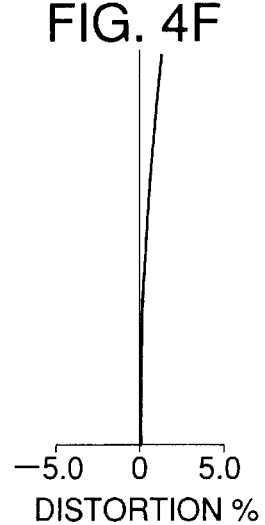
Figure 4G:
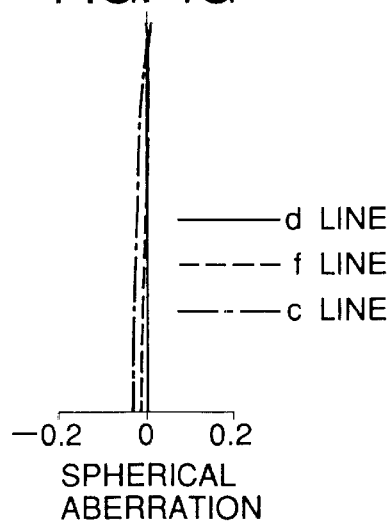
Figure 4H:
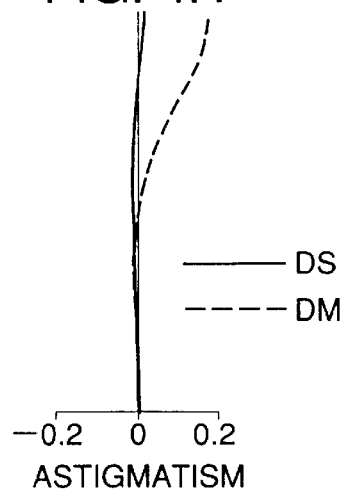
Figure 4I:
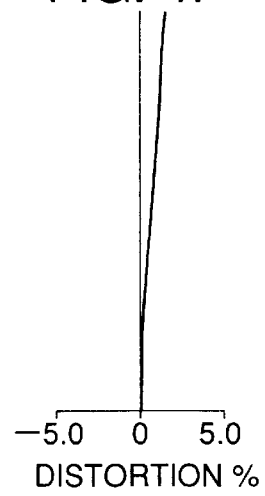
Figure 6A:
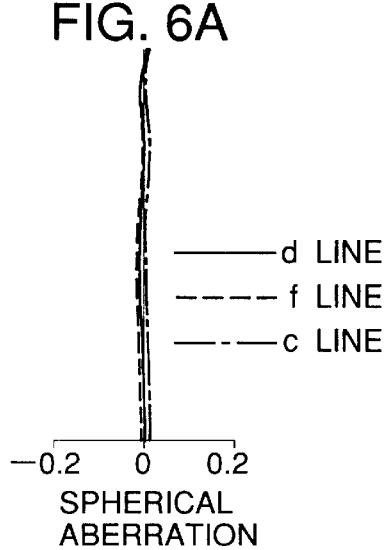
FIGS. 6A to 6I are graphic representations of aberrations observed in the zoom lens system of the third embodiment.
Figure 6B:
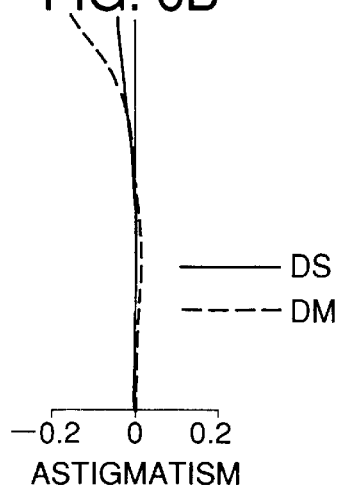
Figure 6C:
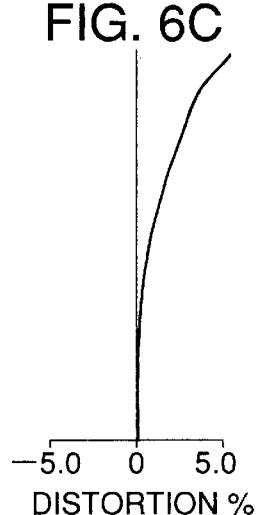
Figure 6D:
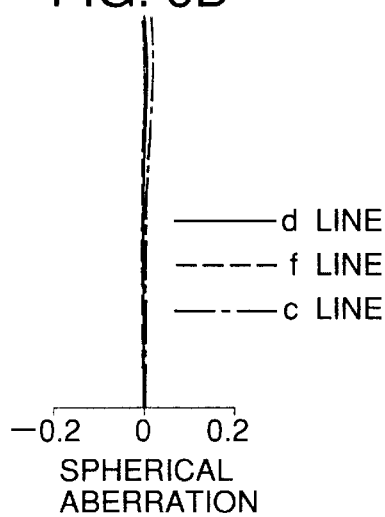
Figure 6E:
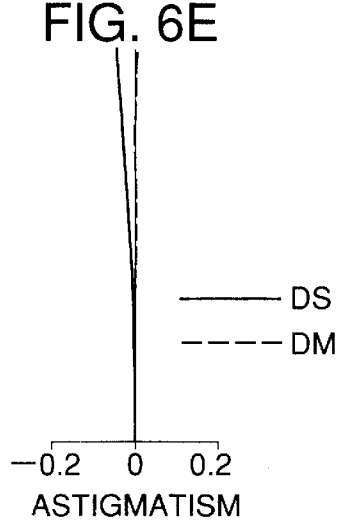
Figure 6F:
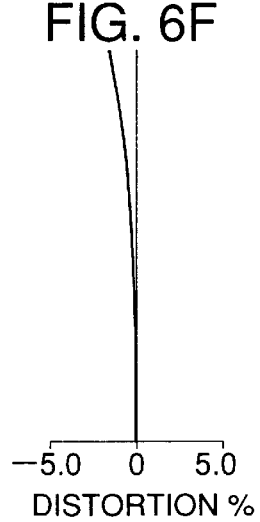
Figure 6G:
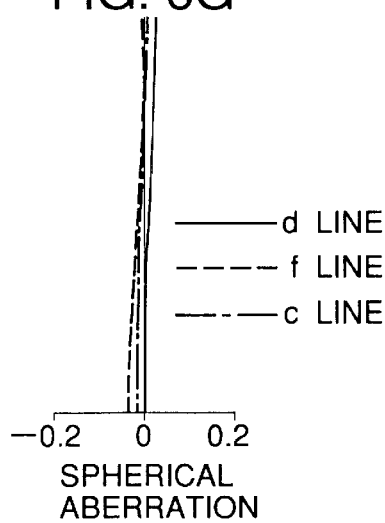
Figure 6H:
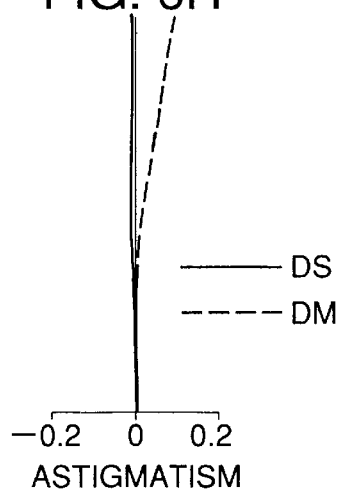
Figure 6I:
Figure 8A:
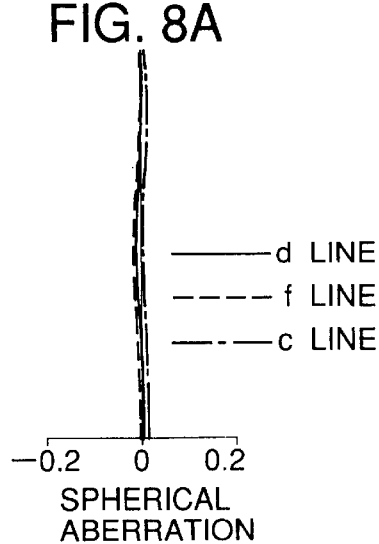
FIGS. 8A to 8I are graphic representations of aberrations observed in the zoom lens system of the fourth embodiment.
Figure 8B:
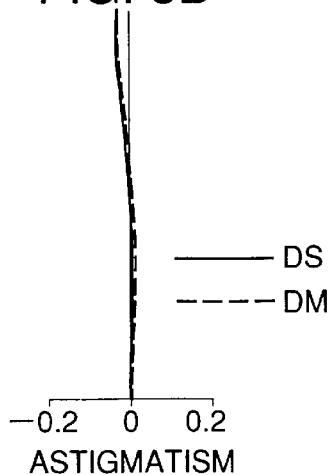
Figure 8C:
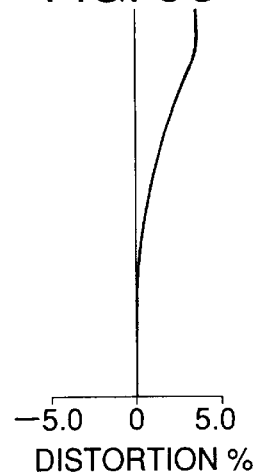
Figure 8D:
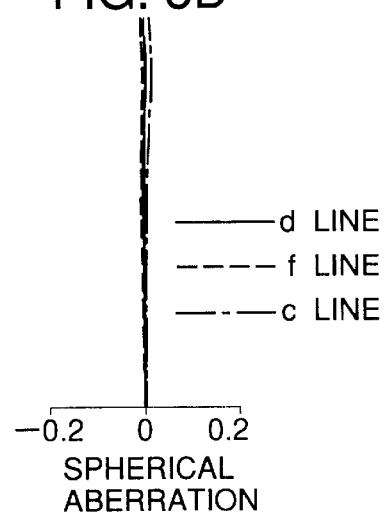
Figure 8E:
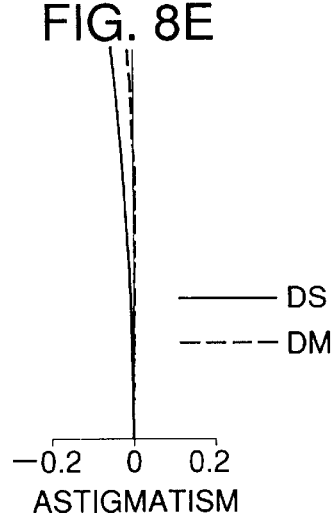
Figure 8F:
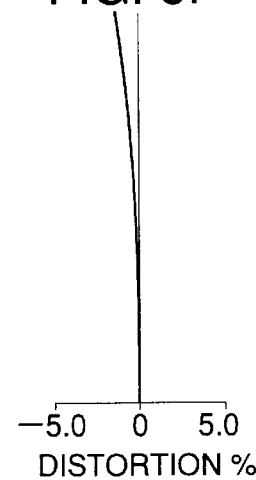
Figure 8G:
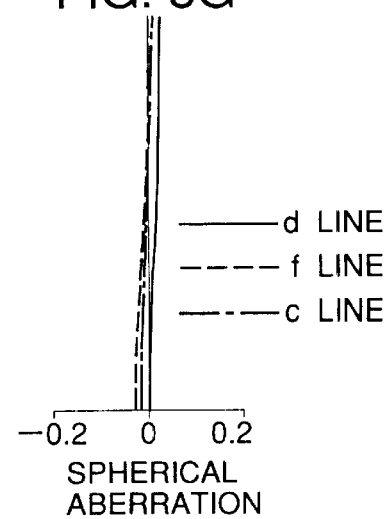
Figure 8H:
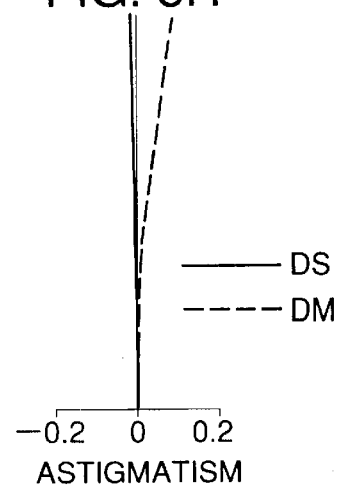
Figure 8I:
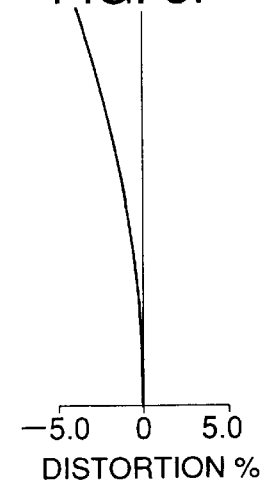

FIGS. 2A to 2I, 4A to 4I, 6A to 6I, and 8A to 8I are graphic representations of the aberrations observed in Examples 1 to 4, respectively. Of these diagrams, FIGS. 2A to 2C, 4A to 4C, 6A to 6C, and 8A to 8C show the aberrations observed at the wide-angle end; FIGS. 2D to 2F, 4D to 4F, 6D to 6F, and 8D to 8F show the aberrations observed at the middle focal length; and FIGS. 2G to 2I, 4G to 4I, 6G to 6I, and 8G to 8I show the aberrations observed at the telephoto end. Of these diagrams, FIGS. 2A, 2D, 2G, 4A, 4D, 4G, 6A, 6D, 6G, 8A, 8D, and 8G show spherical aberration (with the maximum value along the vertical axis corresponding to the value of FNO in each of the three focal-length conditions); FIGS. 2B, 2E, 2H, 4B, 4E, 4H, 6B, 6E, 6H, 8B, 8E, and 8H show astigmatism; and FIGS. 2C, 2F, 2I, 4C, 4F, 4I, 6C, 6F, 6I, 8C, 8F, and 8I show distortion. In the diagrams showing spherical aberration, the solid line, the broken line, and the dash-and-dot line represent the aberration for d-line, f-line, and c-line, respectively. In the diagrams showing astigmatism, the solid line (DS) and the broken line (DM) represent the aberration for d-line on the sagittal plane and on the meridional plane, respectively.

As described heretofore, according to the present invention, it is possible to achieve a high-performance zoom lens system that, despite providing a high aperture ratio and a high magnification, consists of a minimal number of constituent lens elements.

TABLE 1

<<Construction Data of Example 1>>
f = 4.500~11.974~25.650 (mm)
2ω = 43.6~17.1~8.0 (°)
FNO = 1.85~2.14~2.65

| Surface | Radius of Curvature | Axial Distance | Refractive Index | Abbe Number |
|---|---|---|---|---|
| S1 | r1 = 17.648 | d1 = 6.00 | Nd1 = 1.67000 | vd1 = 57.07 |
| S2*# | r2 = 218.761 | d2 = 1.500~10.443~16.149 | | |
| S3* | r3 = 19.489 | d3 = 1.20 | . . . (GRIN1) | |
| S4*# | r4 = 4.584 | d4 = 8.956~2.402~2.401 | | |
| S5# | r5 = −3.528 | d5 = 1.74 | Nd2 = 1.58913 | vd2 = 61.11 |
| S6 | r6 = −3.632 | d6 = 0.575~2.120~3.515 | | |
| S7 | r7 = −32.736 | d7 = 2.09 | . . . (GRIN2) | |
| S8* | r8 = −29.635 | d8 = 3.151~2.918~0.500 | | |
| S9 | r9 = ∞ | d9 = 4.50 | Nd3 = 1.51633 | vd3 = 64.15 |
| S10 | r10 = ∞ | | | |

[Aspherical Coefficients of Surface S2]

$\epsilon$ = 1.0000
A4 = 0.315946 × 10⁻⁴
A6 = −0.220463 × 10⁻⁶
A8 = 0.103431 × 10⁻⁸
A10 = −0.622126 × 10⁻¹²

[Aspherical Coefficients of Surface S3]

$\epsilon$ = 1.0000
A4 = 0.951591 × 10⁻⁴
A6 = 0.139710 × 10⁻⁵
A8 = 0.312942 × 10⁻⁵
A10 = −0.192338 × 10⁻⁶
A12 = 0.173460 × 10⁻⁸

[Aspherical Coefficients of Surface S4]

$\epsilon$ = 1.0000
A4 = −0.749486 × 10⁻³
A6 = 0.546413 × 10⁻⁴

TABLE 1-continued $$A8 = 0.294760 \times 10^{-4}$$
$$A10 = -0.273638 \times 10^{-5}$$

[Aspherical Coefficients of Surface S5]

$$\epsilon = 1.0000$$
$$A4 = -0.451936 \times 10^{-2}$$
$$A6 = -0.501670 \times 10^{-3}$$
$$A8 = 0.135049 \times 10^{-3}$$
$$A10 = -0.377007 \times 10^{-4}$$
$$A12 = -0.919654 \times 10^{-6}$$

[Aspherical Coefficients of Surface S8]

$$\epsilon = 1.0000$$
$$A4 = -0.237059 \times 10^{-3}$$
$$A6 = 0.210044 \times 10^{-4}$$
$$A8 = -0.569272 \times 10^{-6}$$
$$A10 = 0.343627 \times 10^{-7}$$
$$A12 = -0.361090 \times 10^{-9}$$

[Phase Coefficients of Surface S2]

$$R2 = -0.115193 \times 10^{-2}$$
$$R4 = -0.777674 \times 10^{-5}$$
$$R6 = 0.13620 \times 10^{-6}$$
$$R8 = -0.731782 \times 10^{-9}$$
$$R10 = 0.590414 \times 10^{-12}$$

[Phase Coefficients of Surface S4]

$$R2 = 0.650879 \times 10^{-2}$$
$$R4 = 0.300165 \times 10^{-3}$$
$$R6 = -0.151678 \times 10^{-4}$$
$$R8 = 0.104684 \times 10^{-5}$$
$$R10 = 0.233231 \times 10^{-7}$$

[Index Distribution Coefficients of GRIN1]

|      | (d-line) | (c-line) | (f-line) |
|------|----------|----------|----------|
| N0...| N0d = 1.68893, | N0c = 1.68250, | N0f = 1.70461 |
| N1...| N1d = $0.244900 \times 10^{-2}$, | N1c = $0.240000 \times 10^{-2}$, | N1f = $0.248900 \times 10^{-2}$ |
| N2...| N2d = $0.250000 \times 10^{-5}$, | N2c = $0.180000 \times 10^{-5}$, | N2f = $0.360000 \times 10^{-5}$ |
| N3...| N3d = $0.180000 \times 10^{-6}$, | N3c = $0.128000 \times 10^{-8}$, | N3f = $0.240000 \times 10^{-6}$ |
| N4...| N4d = $0.600000 \times 10^{-8}$, | N4c = $0.800000 \times 10^{-8}$, | N4f = $0.400000 \times 10^{-8}$ |

[Index Distribution Coefficients of GRIN2]

|      | (d-line) | (c-line) | (f-line) |
|------|----------|----------|----------|
| N0...| N0d = 1.58913, | N0c = 1.58619, | N0f = 1.59583 |
| N1...| N1d = $-0.352716 \times 10^{-1}$, | N1c = $-03.53733 \times 10^{-1}$, | N1f = $-0.352255 \times 10^{-1}$ |
| N2...| N2d = $-0.138879 \times 10^{-3}$, | N2c = $-0.143585 \times 10^{-3}$, | N2f = $-0.156680 \times 10^{-3}$ |
| N3...| N3d = $-0.761692 \times 10^{-5}$, | N3c = $-0.737068 \times 10^{-5}$, | N3f = $-0.666698 \times 10^{-5}$ |
| N4...| N4d = $0.397344 \times 10^{-6}$, | N4c = $0.396329 \times 10^{-6}$, | N4f = $0.381394 \times 10^{-6}$ |

TABLE 2

<<Construction Data of Example 2>>
f = 4.500~11.970~25.648 (mm)
2ω = 43.6~17.1~8.0 (°)
FNO = 1.85~2.14~2.65

| Surface | Radius of Curvature | Axial Distance | Refractive Index | Abbe Number |
|---------|---------------------|----------------|------------------|-------------|
| S1      | r1 = 22.511         | d1 = 3.00      | Nd1 = 1.67000    | vd1 = 57.07 |
| S2*#    | r2 = -133.741       | d2 = 1.874~10.535~17.530 | | |
| S3*     | r3 = -45.836        | d3 = 1.19      | ...(GRIN1)       |             |
| S4*     | r4 = 7.259          | d4 = 16.110~7.093~3.054 | | |
| S5      | r5 = 1074.711       | d5 = 1.84      | Nd2 = 1.58913    | vd2 = 61.11 |

TABLE 2-continued

| Surface | Radius of Curvature | Axial Distance | Refractive Index | Abbe Number |
|---------|---------------------|----------------|------------------|-------------|
| S6      | r6 = -6.345         | d6 = 1.960~1.678~1.343 | | |
| S7      | r7 = -5.713         | d7 = 1.99      | ...(GRIN2)       |             |
| S8*     | r8 = -6.196         | d8 = 2.482~3.121~0.500 | | |
| S9      | r9 = ∞              | d9 = 4.50      | Nd3 = 1.51633    | vd3 = 64.15 |
| S10     | r10 = ∞             |                |                  |             |

[Aspherical Coefficients of Surface S2]

$$\epsilon = 1.0000$$
$$A4 = 0.265939 \times 10^{-4}$$
$$A6 = -0.161807 \times 10^{-6}$$
$$A8 = -0.178798 \times 10^{-8}$$
$$A10 = 0.314265 \times 10^{-10}$$

[Aspherical Coefficients of Surface S3]

$$\epsilon = 1.0000$$
$$A4 = 0.487689 \times 10^{-3}$$
$$A6 = 0.205231 \times 10^{-4}$$
$$A8 = 0.322970 \times 10^{-5}$$
$$A10 = -0.160004 \times 10^{-6}$$
$$A12 = 0.264528 \times 10^{-8}$$

[Aspherical Coefficients of Surface S4]

$$\epsilon = 1.0000$$
$$A4 = -0.388569 \times 10^{-3}$$
$$A6 = 0.951283 \times 10^{-5}$$
$$A8 = 0.180463 \times 10^{-4}$$
$$A10 = -0.259983 \times 10^{-5}$$
$$A12 = 0.821291 \times 10^{-7}$$

[Aspherical Coefficients of Surface S5]

$$\epsilon = 1.0000$$
$$A4 = -0.213988 \times 10^{-2}$$
$$A6 = 0.537121 \times 10^{-4}$$
$$A8 = -0.237078 \times 10^{-4}$$
$$A10 = 0.330489 \times 10^{-5}$$
$$A12 = -0.186163 \times 10^{-6}$$

[Aspherical Coefficients of Surface S8]

$$\epsilon = 1.0000$$
$$A4 = 0.252423 \times 10^{-3}$$
$$A6 = -0.129516 \times 10^{-4}$$
$$A8 = -0.626213 \times 10^{-6}$$
$$A10 = -0.396109 \times 10^{-6}$$
$$A12 = 0.745911 \times 10^{-8}$$

[Phase Coefficients of Surface S2]

$$R2 = -0.807230 \times 10^{-3}$$
$$R4 = -0.843223 \times 10^{-5}$$
$$R6 = 0.116234 \times 10^{-5}$$
$$R8 = 0.106355 \times 10^{-8}$$
$$R10 = -0.215881 \times 10^{-10}$$

[Index Distribution Coefficients of GRIN1]

|      | (d-line) | (c-line) | (f-line) |
|------|----------|----------|----------|
| N0...| N0d = 1.68893, | N0c = 1.68250, | N0f = 1.70461 |
| N1...| N1d = $0.622548 \times 10^{-2}$, | N1c = $0.628328 \times 10^{-2}$, | N1f = $0.589901 \times 10^{-2}$ |
| N2...| N2d = $0.309774 \times 10^{-4}$, | N2c = $0.166568 \times 10^{-3}$, | N2f = $-0.272080 \times 10^{-4}$ |
| N3...| N3d = $-0.304718 \times 10^{-5}$, | N3c = $-0.181063 \times 10^{-4}$, | N3f = $0.471857 \times 10^{-5}$ |
| N4...| N4d = $0.254698 \times 10^{-5}$, | N4c = $0.296326 \times 10^{-5}$, | N4f = $0.230854 \times 10^{-5}$ |

[Index Distribution Coefficients of GRIN2]

|      | (d-line) | (c-line) | (f-line) |
|------|----------|----------|----------|
| N0...| N0d = 1.58913, | N0c = 1.58619, | N0f = 1.59583 |
| N1...| N1d = | N1c = | N1f = |

TABLE 2-continued

|     |                              |                              |                              |
|-----|------------------------------|------------------------------|------------------------------|
|     | $-0.146521 \times 10^{-1}$,  | $-0.146797 \times 10^{-1}$,  | $-0.144613 \times 10^{-1}$   |
| N2...| N2d = $-0.277589 \times 10^{-3}$, | N2c = $-0.302424 \times 10^{-3}$, | N2f = $-0.277479 \times 10^{-3}$ |
| N3...| N3d = $-0.264829 \times 10^{-5}$, | N3c = $0.499153 \times 10^{-9}$, | N3f = $-0.510408 \times 10^{-5}$ |
| N4...| N4d = $0.152335 \times 10^{-5}$, | N4c = $0.145287 \times 10^{-5}$, | N4f = $0.176745 \times 10^{-5}$ |

TABLE 3

<<Construction Data of Example 3>>
f = 4.500~11.970~25.650 (mm)
2ω = 43.6~17.1~8.0 (°)
FNO = 1.85~2.14~2.65

| Surface | Radius of Curvature | Axial Distance | Refractive Index | Abbe Number |
|---------|---------------------|----------------|------------------|-------------|
| S1      | r1 = 15.797         | d1 = 6.00      | Nd1 = 1.67000    | vd1 = 57.07 |
| S2*#    | r2 = 89.417         | d2 = 1.500~10.488~15.079 |          |             |
| S3*     | r3 = 8.018          | d3 = 1.20      | ...(GRIN1)       |             |
| S4*#    | r4 = 2.833          | d4 = 9.448~4.712~2.401 |          |             |
| S5*     | r5 = -2.461         | d5 = 0.52      | Nd2 = 1.58913    | vd2 = 61.11 |
| S6      | r6 = -2.550         | d6 = 0.500~1.945~4.243 |          |             |
| S7      | r7 = 6.335          | d7 = 0.76      | Nd3 = 1.84666    | vd3 = 23.82 |
| S8*     | r8 = 3.700          | d8 = 4.00      | Nd4 = 1.58913    | vd4 = 61.11 |
| S9*     | r9 = -4.971         | d9 = 2.775~2.519~0.500 |          |             |
| S10     | r10 = ∞             | d10 =          | Nd5 = 1.51633    | vd5 = 64.15 |
| S11     | r11 = ∞             | 4.50           |                  |             |

[Aspherical Coefficients of Surface S2]

$\epsilon = 1.0000$
A4 = $0.434088 \times 10^{-4}$
A6 = $-0.573295 \times 10^{-6}$
A8 = $0.695724 \times 10^{-8}$
A10 = $-0.299018 \times 10^{-10}$

[Aspherical Coefficients of Surface S3]

$\epsilon = 1.0000$
A4 = $-0.252875 \times 10^{-2}$
A6 = $0.277003 \times 10^{-3}$
A8 = $-0.276314 \times 10^{-4}$
A10 = $0.108379 \times 10^{-5}$
A12 = $0.173460 \times 10^{-8}$

[Aspherical Coefficients of Surface S4]

$\epsilon = 1.0000$
A4 = $-0.731088 \times 10^{-2}$
A6 = $-0.301888 \times 10^{-3}$
A8 = $0.435497 \times 10^{-4}$
A10 = $-0.995262 \times 10^{-5}$

[Aspherical Coefficients of Surface S5]

$\epsilon = 1.0000$
A4 = $-0.257270 \times 10^{-2}$
A6 = $-0.105948 \times 10^{-3}$
A8 = $-0.385597 \times 10^{-3}$
A10 = $0.148930 \times 10^{-3}$
A12 = $-0.258558 \times 10^{-4}$

[Aspherical Coefficients of Surface S9]

$\epsilon = 1.0000$
A4 = $0.142682 \times 10^{-2}$
A6 = $0.108850 \times 10^{-3}$
A8 = $-0.253887 \times 10^{-4}$
A10 = $0.292283 \times 10^{-5}$
A12 = $-0.131052 \times 10^{-6}$

[Phase Coefficients of Surface S2]

R2 = $-0.116134 \times 10^{-2}$
R4 = $-0.115095 \times 10^{-4}$
R6 = $0.372317 \times 10^{-6}$
R8 = $-0.474343 \times 10^{-8}$
R10 = $0.206117 \times 10^{-10}$ TABLE 3-continued

[Phase Coefficients of Surface S4]

R2 = $0.514458 \times 10^{-2}$
R4 = $0.882018 \times 10^{-3}$
R6 = $0.196602 \times 10^{-3}$
R8 = $-0.691768 \times 10^{-4}$
R10 = $0.3055125 \times 10^{-5}$

[Index Distribution Coefficients of GRIN1]

|     | (d-line) | (c-line) | (f-line) |
|-----|----------|----------|----------|
| N0...| N0d = 1.68893, | N0c = 1.68250, | N0f = 1.70461 |
| N1...| N1d = $0.244900 \times 10^{-2}$, | N1c = $0.240000 \times 10^{-2}$, | N1f = $0.248900 \times 10^{-2}$ |
| N2...| N2d = $0.250000 \times 10^{-5}$, | N2c = $0.180000 \times 10^{-5}$, | N2f = $0.360000 \times 10^{-5}$ |
| N3...| N3d = $0.180000 \times 10^{-6}$, | N3c = $0.128000 \times 10^{-6}$, | N3f = $0.240000 \times 10^{-6}$ |
| N4...| N4d = $0.600000 \times 10^{-8}$, | N4c = $0.800000 \times 10^{-8}$, | N4f = $0.400000 \times 10^{-8}$ |

TABLE 4

<<Construction Data of Example 4>>
f = 4.500~11.970~25.650 (mm)
2ω = 43.6~17.1~8.0 (°)
FNO = 2.00~2.20~2.65

| Surface | Radius of Curvature | Axial Distance | Refractive Index | Abbe Number |
|---------|---------------------|----------------|------------------|-------------|
| S1      | r1 = 16.090         | d1 = 6.00      | Nd1 = 1.67000    | vd1 = 57.07 |
| S2*#    | r2 = 88.091         | d2 = 1.500~10.498~15.481 |          |             |
| S3*     | r3 = 6.870          | d3 = 1.20      | ...(GRIN1)       |             |
| S4*#    | r4 = 2.680          | d4 = 9.575~4.235~2.401 |          |             |
| S5*     | r5 = -2.583         | d5 = 0.49      | Nd2 = 1.58913    | vd2 = 61.11 |
| S6      | r6 = -2.654         | d6 = 0.500~1.992~3.948 |          |             |
| S7      | r7 = 6.490          | d7 = 0.68      | Nd3 = 1.84666    | vd3 = 23.82 |
| S8      | r8 = 3.755          | d8 = 4.00      | Nd4 = 1.58913    | vd4 = 61.11 |
| S9*     | r9 = -4.813         | d9 = 2.755~2.593~0.500 |          |             |
| S10     | r10 = ∞             | d10 =          | Nd5 = 1.51633    | vd5 = 64.15 |
| S11     | r11 = ∞             | 4.50           |                  |             |

[Aspherical Coefficients of Surface S2]

$\epsilon = 1.0000$
A4 = $0.413135 \times 10^{-4}$
A6 = $-0.572308 \times 10^{-6}$
A8 = $0.695463 \times 10^{-8}$
A10 = $-0.299451 \times 10^{-10}$

[Aspherical Coefficients of Surface S3]

$\epsilon = 1.0000$
A4 = $-0.306554 \times 10^{-2}$
A6 = $0.205407 \times 10^{-3}$
A8 = $-0.136020 \times 10^{-4}$
A10 = $0.311147 \times 10^{-6}$
A12 = $0.173460 \times 10^{-8}$

[Aspherical Coefficients of Surface S4]

$\epsilon = 1.0000$
A4 = $-0.966688 \times 10^{-2}$
A6 = $-0.403297 \times 10^{-4}$
A8 = $-0.368630 \times 10^{-4}$
A10 = $-0.995262 \times 10^{-5}$

[Aspherical Coefficients of Surface S5]

$\epsilon = 1.0000$
A4 = $-0.253535 \times 10^{-2}$
A6 = $0.251267 \times 10^{-4}$
A8 = $-0.456775 \times 10^{-3}$
A10 = $0.169697 \times 10^{-3}$
A12 = $-0.258558 \times 10^{-4}$

[Aspherical Coefficients of Surface S9]

$\epsilon = 1.0000$
A4 = $0.151120 \times 10^{-2}$
A6 = $0.887360 \times 10^{-4}$

TABLE 4-continued $A8 = -0.206285 \times 10^{-4}$
$A10 = 0.253984 \times 10^{-5}$
$A12 = -0.118868 \times 10^{-6}$
[Phase Coefficients of Surface S2]

$R2 = -0.116134 \times 10^{-2}$
$R4 = -0.113046 \times 10^{-4}$
$R6 = 0.369518 \times 10^{-6}$
$R8 = -0.468896 \times 10^{-8}$
$R10 = 0.204026 \times 10^{-10}$
[Phase Coefficients of Surface S4]

$R2 = 0.514458 \times 10^{-2}$
$R4 = 0.154266 \times 10^{-4}$
$R6 = -0.331580 \times 10^{-3}$
$R8 = 0.709356 \times 10^{-4}$
$R10 = -0.906991 \times 10^{-5}$
[Index Distribution Coefficients of GRIN1]

|     | (d-line) | (c-line) | (f-line) |
|-----|----------|----------|----------|
| N0 ... | N0d = 1.68893, | N0c = 1.68250, | N0f = 1.70461 |
| N1 ... | N1d = $0.244900 \times 10^{-2}$, | N1c = $0.240000 \times 10^{-2}$, | N1f = $0.248900 \times 10^{-2}$ |
| N2 ... | N2d = $0.250000 \times 10^{-5}$, | N2c = $0.180000 \times 10^{-5}$, | N2f = $0.360000 \times 10^{-5}$ |
| N3 ... | N3d = $0.180000 \times 10^{-6}$, | N3c = $0.128000 \times 10^{-6}$, | N3f = $0.240000 \times 10^{-6}$ |
| N4 ... | N4d = $0.600000 \times 10^{-8}$, | N4c = $0.800000 \times 10^{-8}$, | N4f = $0.400000 \times 10^{-8}$ |

TABLE 5

<<Values Corresponding to Conditions in Example 1 (No. 1)>>

| Cond. |  | Values |  |
|-------|--|--------|--|
| (1) | $|\phi2/\phi W|$ |  | 0.58500 |
| (4) | $|\phi1/\phi2|$ |  | 0.28700 |
| (6) | (R12 + R11)/(R12 − R11) | Gr1 | 1.176 |
| (14) | (R22 + R21)/(R22 − R21) | Gr2 | −1.615 |
| (22) | (R42 + R41)/(R42 − R41) | Gr4 | −20.114 |

TABLE 6

<<Values Corresponding to Conditions in Example 1 (No. 2)>>

|  |  | Values | |
|---|---|---|---|
| Cond. |  | Gr1 | Gr2 |
| (3):$|\phi d/\phi|$ |  |  |  |
| (5):$|\phi1d/\phi1|$ |  | 0.06175 | — |
| (13):$|\phi2d/\phi2|$ |  | — | 0.10014 |
| $\phi1d$ |  | 0.00230 | — |
| $\phi1$ |  | 0.03731 | — |
| $\phi2d$ |  | — | −0.01302 |
| $\phi2$ |  | — | −0.13000 |

TABLE 7

<<Values Corresponding to Conditions in Example 1 (No. 3)>>

|  |  | Values | |
|---|---|---|---|
| Cond. |  | Gr2 | Gr4 |
| (2) | :sgn[$\phi G$].N1/$\phi G^2$ |  |  |
| (8) | :N1d2/$\phi2^2$ | 0.14491 | — |
| (19) | :N1d4/$\phi4^2$ | — | 1.68387 |
| (10A) | (N1F2−N1d2)/$\phi2G^2$ F-lin | 0.002 | — |

TABLE 7-continued

<<Values Corresponding to Conditions in Example 1 (No. 3)>>

|  |  | Values | |
|---|---|---|---|
| Cond. |  | Gr2 | Gr4 |
| (10B) | (N1C2−N1d2)/$\phi2G^2$ C-lin | −0.003 | — |
| (18A) | (N1F4−N1d4)/$\phi4G^2$ F-lin | — | 0.002 |
| (18B) | (N1C4−N1d4)/$\phi4G^2$ C-lin | — | −0.005 |
| (11) | $|N2d2/\phi2^4|$ | 0.00875 | — |
| (12) | $\phi2GM/\phi2GS$ | 0.04737 | — |
| (20) | $|N2d4/\phi4^4|$ | — | −0.31652 |
| (21) | $\phi4GM/\phi4GS$ | — | −57.96153 |

TABLE 8

<<Values Corresponding to Conditions in Example 1 (No. 4)>>
sgn[N1]{vd(H)−vd(0)}/vd(0)

|  | Cond. (9) | Cond. (17) |
|---|---|---|
| H | Gr2 | Gr4 |
| 0.0 Hmax | 0.000 | 0.000 |
| 0.1 Hmax | 0.000 | −0.009 |
| 0.2 Hmax | 0.000 | −0.036 |
| 0.3 Hmax | 0.001 | −0.080 |
| 0.4 Hmax | 0.002 | −0.140 |
| 0.5 Hmax | 0.003 | −0.214 |
| 0.6 Hmax | 0.006 | −0.302 |
| 0.7 Hmax | 0.010 | −0.404 |
| 0.8 Hmax | 0.015 | −0.519 |
| 0.9 Hmax | 0.023 | −0.650 |
| 1.0 Hmax | 0.032 | −0.795 |

TABLE 9

Values Corresponding to Conditions in Example 1 (No. 5)
Condition: $(\phi a - \phi 0a)/(\phi1 \sim \phi4)$

|  | (7) | (15) |  | (16) | (23) |
|---|---|---|---|---|---|
|  | Gr1 | Gr2 |  | Gr3 | Gr4 |
| H | S2 | S3 | S4 | S5 | S8 |
| 0.0 Hmax | 0.000 | 0.000 | 0.000 | 0.000 | 0.000 |
| 0.1 Hmax | 0.007 | 0.001 | 0.005 | 0.047 | 0.000 |
| 0.2 Hmax | 0.025 | 0.005 | 0.017 | 0.187 | 0.001 |
| 0.3 Hmax | 0.052 | 0.013 | 0.023 | 0.421 | 0.000 |
| 0.4 Hmax | 0.083 | 0.031 | −0.001 | 0.739 | −0.004 |
| 0.5 Hmax | 0.112 | 0.068 | −0.074 | 1.121 | −0.014 |
| 0.6 Hmax | 0.137 | 0.130 | −0.162 | 1.552 | −0.031 |
| 0.7 Hmax | 0.164 | 0.200 | −0.123 | 2.059 | −0.057 |
| 0.8 Hmax | 0.203 | 0.209 | 0.276 | 2.747 | −0.090 |
| 0.9 Hmax | 0.277 | −0.003 | 1.484 | 3.756 | −0.128 |
| 1.0 Hmax | 0.423 | −0.752 | 6.721 | 5.009 | −0.158 |

TABLE 10

Values Corresponding to Conditions in Example 2 (No. 1)

| Cond. |  | Values |  |
|-------|--|--------|--|
| (1) | $|\phi2/\phi W|$ |  | 0.56870 |
| (4) | $|\phi1/\phi2|$ |  | 0.28512 |
| (6) | (R12 + R11)/(R12 − R11) | Gr1 | 0.712 |
| (14) | (R22 + R21)/(R22 − R21) | Gr2 | −0.727 |
| (22) | (R42 + R41)/(R42 − R41) | Gr4 | 24.681 |

TABLE 11

Values Corresponding to Conditions in Example 2 (No. 2)

| Cond. | Values Gr1 |
|---|---|
| (3):$|\phi d/\phi|$ | / |
| (5):$|\phi 1d/\phi 1|$ | 0.04481 |
| $\phi 1d$ | 0.00161 |
| $\phi 1$ | 0.03603 |

TABLE 12

Values Corresponding to Conditions in Example 2 (No. 3)

| Cond. | | | Values Gr2 | Gr4 |
|---|---|---|---|---|
| (2):$sgn[\phi G] \cdot N1/\phi G^2$ | | | / | / |
| (8):$N1d2/\phi 2^2$ | | | 0.38984 | — |
| (19):$N1d4/\phi 4^2$ | | | — | 3.79941 |
| (10A) | $(N1F2 - N1d2)/\phi 2G^2$ | F-line | -0.020 | — |
| (10B) | $(N1C2 - N1d2)/\phi 2G^2$ | C-line | 0.004 | — |
| (18A) | $(N1F4 - N1d4)/\phi 4G^2$ | F-line | — | 0.049 |
| (18B) | $(N1C4 - N1d4)/\phi 4G^2$ | C-line | — | -0.007 |
| (11) | $|N2d2/\phi 2^4|$ | | 0.12147 | — |
| (12) | $\phi 2GM/\phi 2GS$ | | 0.13293 | — |
| (20) | $|N2d4/\phi 4^4|$ | | — | -18.66535 |
| (21) | $\phi 4GM/\phi 4GS$ | | — | 15.80890 |

TABLE 13

Values Corresponding to Conditions in Example 2 (No. 4)
$sgn[N1]\{vd(H) - vd(0)\}/vd(0)$

| H | Cond.(9) Gr2 | Cond.(17) Gr4 |
|---|---|---|
| 0.0 Hmax | 0.000 | 0.000 |
| 0.1 Hmax | -0.005 | -0.008 |
| 0.2 Hmax | -0.023 | -0.031 |
| 0.3 Hmax | -0.063 | -0.071 |
| 0.4 Hmax | -0.137 | -0.126 |
| 0.5 Hmax | -0.255 | -0.193 |
| 0.6 Hmax | -0.414 | -0.268 |
| 0.7 Hmax | -0.579 | -0.350 |
| 0.8 Hmax | -0.680 | -0.444 |
| 0.9 Hmax | -0.730 | -0.558 |
| 1.0 Hmax | -0.969 | -0.683 |

TABLE 14

Values Corresponding to Conditions in Example 2 (No. 5)

Condition: $(\phi a - \phi 0a)/(\phi 1 \sim \phi 4)$

| | (7) Gr1 | (15) Gr2 | | (16) Gr3 | (23) Gr4 |
|---|---|---|---|---|---|
| H | S2 | S3 | S4 | S5 | S8 |
| 0.0 Hmax | 0.000 | 0.000 | 0.000 | 0.000 | 0.000 |
| 0.1 Hmax | 0.003 | 0.006 | 0.003 | 0.015 | -0.008 |
| 0.2 Hmax | 0.014 | 0.024 | 0.010 | 0.057 | -0.031 |
| 0.3 Hmax | 0.029 | 0.062 | 0.011 | 0.128 | -0.067 |
| 0.4 Hmax | 0.047 | 0.134 | -0.009 | 0.230 | -0.106 |
| 0.5 Hmax | 0.064 | 0.270 | -0.039 | 0.369 | -0.133 |
| 0.6 Hmax | 0.078 | 0.505 | 0.018 | 0.550 | -0.115 |
| 0.7 Hmax | 0.088 | 0.884 | 0.368 | 0.777 | -0.002 |
| 0.8 Hmax | 0.102 | 1.443 | 1.219 | 1.089 | 0.243 |
| 0.9 Hmax | 0.150 | 2.213 | 2.125 | 1.687 | 0.564 |
| 1.0 Hmax | 0.296 | 3.238 | -1.941 | 3.125 | 0.707 |

TABLE 15

Values Corresponding to Conditions in Example 3 (No. 1)

| Cond. | | Values | |
|---|---|---|---|
| (1) | $|\phi 2/\phi W|$ | | 0.71235 |
| (4) | $|\phi 1/\phi 2|$ | | 0.24024 |
| (6) | $(R12 + R11)/(R12 - R11)$ | Gr1 | 1.429 |
| (14) | $(R22 + R21)/(R22 - R21)$ | Gr2 | -2.093 |

TABLE 16

Values Corresponding to Conditions in Example 3 (No. 2)

| Cond. | Values Gr1 | Gr2 |
|---|---|---|
| (3):$|\phi d/\phi|$ | / | / |
| (5):$|\phi 1d/\phi 1|$ | 0.06107 | — |
| (13):$|\phi 2d/\phi 2|$ | — | 0.06500 |
| $\phi 1d$ | 0.00232 | — |
| $\phi 1$ | 0.03803 | — |
| $\phi 2d$ | — | -0.01029 |
| $\phi 2$ | — | -0.15830 |

TABLE 17

Values Corresponding to Conditions in Example 3 (No. 3)

| Cond. | | | Values Gr2 |
|---|---|---|---|
| (2):$sgn[\phi G] \cdot N1/\phi G^2$ | | | / |
| (8):$N1d2/\phi 2^2$ | | | 0.09773 |
| (10A) | $(N1F2 - N1d2)/\phi 2G^2$ | F-line | 0.002 |
| (10B) | $(N1C2 - N1d2)/\phi 2G^2$ | C-line | -0.002 |
| (11) | $|N2d2/\phi 2^4|$ | | 0.00398 |
| (12) | $\phi 2GM/\phi 2GS$ | | 0.03856 |

TABLE 18

Values Corresponding to Conditions in Example 3 (No. 4)
$sgn[N1]\{vd(H) - vd(0)\}/vd(0)$

| H | Cond. (9) Gr2 |
|---|---|
| 0.0 Hmax | 0.000 |
| 0.1 Hmax | 0.000 |
| 0.2 Hmax | 0.000 |
| 0.3 Hmax | 0.001 |
| 0.4 Hmax | 0.002 |
| 0.5 Hmax | 0.003 |
| 0.6 Hmax | 0.006 |
| 0.7 Hmax | 0.010 |
| 0.8 Hmax | 0.015 |
| 0.9 Hmax | 0.023 |

TABLE 18-continued

Values Corresponding to Conditions in Example 3 (No. 4)
$sgn[N1]\{vd(H) - vd(0)\}/vd(0)$

| | Cond. (9) |
|---|---|
| H | Gr2 |
| 1.0 Hmax | 0.032 |

TABLE 19

Values Corresponding to Conditions in Example 3 (No. 5)

Condition: $(\phi a - \phi 0a)/(\phi 1 \sim \phi 4)$

| | (7) Gr1 | (15) Gr2 | | (16) Gr3 | (23) Gr4 |
|---|---|---|---|---|---|
| H | S2 | S3 | S4 | S5 | S9 |
| 0.0 Hmax | 0.000 | 0.000 | 0.000 | 0.000 | 0.000 |
| 0.1 Hmax | 0.009 | −0.020 | 0.029 | 0.068 | −0.011 |
| 0.2 Hmax | 0.032 | −0.069 | 0.110 | 0.265 | −0.046 |
| 0.3 Hmax | 0.063 | −0.124 | 0.227 | 0.586 | −0.101 |
| 0.4 Hmax | 0.094 | −0.175 | 0.352 | 1.036 | −0.169 |
| 0.5 Hmax | 0.127 | −0.232 | 0.459 | 1.597 | −0.237 |
| 0.6 Hmax | 0.175 | −0.306 | 0.523 | 2.173 | −0.297 |
| 0.7 Hmax | 0.249 | −0.322 | 0.515 | 2.640 | −0.336 |
| 0.8 Hmax | 0.336 | 0.094 | 0.282 | 3.060 | −0.252 |
| 0.9 Hmax | 0.340 | 1.732 | −1.056 | 3.668 | 0.333 |
| 1.0 Hmax | 0.002 | 3.270 | −1.803 | 3.593 | 1.710 |

TABLE 20

Values Corresponding to Conditions in Example 4 (No. 1)

| | Cond. | | Values |
|---|---|---|---|
| (1) | $|\phi 2/\phi W|$ | | 0.69408 |
| (4) | $|\phi 1/\phi 2|$ | | 0.24086 |
| (6) | (R12 + R11)/(R12 − R11) | Gr1 | 1.447 |
| (14) | (R22 + R21)/(R22 − R21) | Gr2 | −2.279 |

TABLE 21

Values Corresponding to Conditions in Example 4 (No. 2)

| | | Values | |
|---|---|---|---|
| Cond. | | Gr1 | Gr2 |
| (3):$|\phi d/\phi|$ | | / | / |
| (5):$|\phi 1d/\phi 1|$ | | 0.06252 | — |
| (13):$|\phi 2d/\phi 2|$ | | — | 0.06671 |
| $\phi 1d$ | | 0.00232 | — |
| $\phi 1$ | | 0.03715 | — |
| $\phi 2d$ | | — | −0.01029 |
| $\phi 2$ | | — | −0.15424 |

TABLE 22

Values Corresponding to Conditions in Example 4 (No. 3)

| | | | Values Gr2 |
|---|---|---|---|
| Cond. | | | |
| (2):$sgn[\phi G] \cdot N1/\phi G^2$ | | | / |
| (8):$N1d2/\phi 2^2$ | | | 0.10294 |
| (10A) | $(N1F2 - N1d2)/\phi 2G^2$ | F-line | 0.002 |
| (10B) | $(N1C2 - N1d2)/\phi 2G^2$ | C-line | −0.002 |

TABLE 22-continued

Values Corresponding to Conditions in Example 4 (No. 3)

| | Cond. | Values Gr2 |
|---|---|---|
| (11) | $|N2d2/\phi 2^4|$ | 0.00442 |
| (12) | $\phi 2GM/\phi 2GS$ | 0.03962 |

TABLE 23

Values Corresponding to Conditions in Example 4 (No. 4)
$sgn[N1]\{vd(H) - vd(0)\}/vd(0)$

| | Cond. (9) |
|---|---|
| H | Gr2 |
| 0.0 Hmax | 0.000 |
| 0.1 Hmax | 0.000 |
| 0.2 Hmax | 0.000 |
| 0.3 Hmax | 0.001 |
| 0.4 Hmax | 0.002 |
| 0.5 Hmax | 0.003 |
| 0.6 Hmax | 0.006 |
| 0.7 Hmax | 0.010 |
| 0.8 Hmax | 0.015 |
| 0.9 Hmax | 0.023 |
| 1.0 Hmax | 0.032 |

TABLE 24

Values Corresponding to Conditions in Example 4 (No. 5)

Condition: $(\phi a - \phi 0a)/(\phi 1 \sim \phi 4)$

| | (7) Gr1 | (15) Gr2 | | (16) Gr3 | (23) Gr4 |
|---|---|---|---|---|---|
| H | S2 | S3 | S4 | S5 | S9 |
| 0.0 Hmax | 0.000 | 0.000 | 0.000 | 0.000 | 0.000 |
| 0.1 Hmax | 0.009 | −0.025 | 0.035 | 0.068 | −0.012 |
| 0.2 Hmax | 0.031 | −0.090 | 0.131 | 0.264 | −0.047 |
| 0.3 Hmax | 0.060 | −0.174 | 0.264 | 0.581 | −0.102 |
| 0.4 Hmax | 0.089 | −0.255 | 0.406 | 1.033 | −0.170 |
| 0.5 Hmax | 0.119 | −0.331 | 0.536 | 1.617 | −0.238 |
| 0.6 Hmax | 0.164 | −0.418 | 0.642 | 2.241 | −0.301 |
| 0.7 Hmax | 0.234 | −0.539 | 0.694 | 2.746 | −0.343 |
| 0.8 Hmax | 0.317 | −0.669 | 0.470 | 3.170 | −0.263 |
| 0.9 Hmax | 0.314 | −0.610 | −1.285 | 3.986 | 0.284 |
| 1.0 Hmax | −0.044 | 0.234 | −2.162 | 5.152 | 1.527 |

What is claimed is:

1. A zoom lens system comprising:
   a first lens unit having a positive optical power;
   a second lens unit having a negative optical power;
   a third lens unit; and
   a fourth lens unit,
      wherein a zooming operation is performed by varying distances between the first, second, third, and fourth lens units,
      wherein the following condition is fulfilled:

$0.4 < |\phi 2/\phi W| < 0.8$ where
   $\phi 2$ represents an optical power of the second lens unit, and
   $\phi W$ represents an optical power of the entire zoom lens system at the wide-angle end, and
      wherein the zoom lens system includes at least one lens element having an index distribution.

2. A zoom lens system as claimed in claim 1, wherein the following condition is fulfilled:

$$0 < sgn[\phi G] \cdot N1/G^2 < 10.0$$

where sgn[$\phi$G] represents a parameter whose value equals +1 when the optical power of the lens unit including the lens element having the index distribution is negative and whose value equals −1 when the optical power of the lens unit including the lens element having the index distribution is positive, N1 represents a second-order coefficient of the index distribution, and $\phi$G represents an optical power of the lens unit including the lens element having the index distribution.

3. A zoom lens system as claimed in claim 1, wherein the second lens unit includes a lens element having the index distribution.

4. A zoom lens system as claimed in claim 1, wherein the following condition is fulfilled:

$$0.1 < |\phi1/\phi2| < 0.4$$

where $\phi$1 represents an optical power of the first lens unit, and $\phi$2 represents an optical power of the second lens unit.

5. A zoom lens system comprising:

a first lens unit having a positive optical power;

a second lens unit having a negative optical power;

a third lens unit; and a fourth lens unit, wherein a zooming operation is performed by varying distances between the first, second, third, and fourth lens units, wherein the following condition is fulfilled:

$$0.4 < |\phi2/\phi W| < 0.8$$

where $\phi$2 represents an optical power of the second lens unit, and $\phi$W represents an optical power of the entire zoom lens system at the wide-angle end, and wherein the zoom lens system includes a surface having a diffractive optical power.

6. A zoom lens system as claimed in claim 5, wherein the following condition is fulfilled:

$$0.02 < |\phi d/\phi| < 0.8$$

where $\phi$d represents an optical power of the surface having the diffractive optical power, and $\phi$represents an optical power of the lens unit including the surface having the diffractive optical power.

7. A zoom lens system as claimed in claim 5, wherein the second lens unit includes a surface having the diffractive optical power.

8. A zoom lens system comprising:

a first lens unit having a positive optical power;

a second lens unit having a negative optical power;

a third lens unit; and a fourth lens unit, wherein a zooming operation is performed by varying distances between the first, second, third, and fourth lens units, wherein the following condition is fulfilled:

$$0.4 < |\phi2/\phi W| < 0.8$$

where $\phi$2 represents an optical power of the second lens unit, and $\phi$W represents an optical power of the entire zoom lens system at the wide-angle end, and wherein the second lens unit consists of a single lens element.

9. A zoom lens system comprising:

a first lens unit having a positive optical power;

a second lens unit having a negative optical power;

a third lens unit; and a fourth lens unit, wherein a zooming operation is performed by varying distances between the first, second, third, and fourth lens units, wherein the following condition is fulfilled:

$$0.4 < |\phi2/\phi W| < 0.8$$

where $\phi$2 represents an optical power of the second lens unit, and $\phi$W represents an optical power of the entire zoom lens system at the wide-angle end, wherein the first lens unit consists of a single lens element having a homogeneous index.

10. A zoom lens system as claimed in claim 9, wherein the single lens element having a homogeneous index has a surface having a diffractive optical power.

11. A zoom lens system as claimed in claim 10, wherein the following condition is fulfilled:

$$0.02 < |\phi1d/\phi1| < 0.8$$

where $\phi$1d represents an optical power of the surface having the diffractive optical power included in the first lens unit, and $\phi$1 represents an optical power of the first lens unit.

12. A zoom lens system as claimed in claim 9, further comprising:

a low-pass filter provided at the image-side end of the zoom lens system.

13. A zoom lens system comprising:

a first lens unit having a positive optical power;

a second lens unit having a negative optical power;

a third lens unit; and a fourth lens unit, wherein a zooming operation is performed by varying distances between the first, second, third, and fourth lens units, wherein the following condition is fulfilled:

$$0.4 < |\phi2/\phi W | < 0.8$$

where $\phi$2 represents an optical power of the second lens unit, and $\phi$W represents an optical power of the entire zoom lens system at the wide-angle end, and wherein the zoom lens system consists of four lens elements.

14. A zoom lens system as claimed in claim 13, wherein each of said four lens elements is selected from the group consisting of a homogeneous lens element, a gradient-index lens element, and a lens element having a diffractive optical surface.

15. A zoom lens system as claimed in claim 13, wherein said four lens elements include at least one bonded lens element.

16. A zoom lens system comprising:
- a first lens unit having a positive optical power, the first lens unit consisting of a single lens element, the first lens unit being moved during the zooming;
- a second lens unit having a negative optical power;
- a third lens unit; and
- a fourth lens unit; and
- a low pass filter,
  - wherein a zooming operation is performed by varying distances between first, second, third and fourth lens units,
  - wherein the following condition is fulfilled:

$$0.1<|\phi1/\phi2|<0.4$$

where
- $\phi1$ represents an optical power of the first lens unit, and
- $\phi2$ represents an optical power of the second lens unit.

17. A zoom lens system as claimed in claim 16, wherein the second lens unit is moved during the zooming operation.

18. A zoom lens system as claimed in claim 16, wherein the second lens unit consists of a single lens element.

19. A zoom lens system as claimed in claim 16, wherein the third lens unit is moved during the zooming operation.

20. A zoom lens system as claimed in claim 16, wherein the third lens unit consists of a single lens element.

21. A zoom lens system as claimed in claim 20, wherein the single lens element has a surface concave to an object side at a most object side end of the third lens unit.

22. A zoom lens system as claimed in claim 21, wherein the fourth lens unit is moved during the zooming operation.

23. A zoom lens system as claimed in claim 16, wherein the fourth lens unit consists of a single lens element.

24. A zoom lens system as claimed in claim 16, wherein the fourth lens unit consists of a negative lens element and a positive lens element bonded to form a doublet lens element.

25. A zoom lens system comprising:
- a first lens unit having a positive optical power and being a single lens element;
- a second lens unit having a negative optical power;
- a third lens unit having a surface concave to an object side at a most object side end of the third lens unit;
- a fourth lens unit; and
- a low pass filter,
  - wherein a zooming operation is performed by varying distances between the first, second, third and fourth lens units.

26. A zoom lens system as claimed in claim 25, wherein the second lens unit is moved during the zooming operation.

27. A zoom lens system as claimed in claim 25, wherein the third lens unit is moved during the zooming operation.

28. A zoom lens system as claimed in claim 25, wherein the third lens unit consists of a single lens element.

29. A zoom lens system as claimed in claim 25, wherein the fourth lens unit consists of a single lens element.

30. A zoom lens system comprising:
- a first lens unit having a positive optical power, and is moved during zooming;
- a second lens unit having a negative optical power;
- a third lens unit having a surface concave to an object side at a most object side end of the third lens unit;
- a fourth lens unit; and
- a low pass filter,
  - wherein a zooming operation is performed by varying distances between the first, second, third and fourth lens units.

31. A zoom lens system comprising:
- a first lens unit having a positive optical power;
- a second lens unit having a negative optical power and consists of a single lens element;
- a third lens unit having a surface concave to an object side at a most object side end of the third lens unit;
- a fourth lens unit; and
- a low pass filter,
  - wherein a zooming operation is performed by varying distances between the first, second, third and fourth lens units.

32. A zoom lens system comprising:
- a first lens unit having a positive optical power;
- a second lens unit having a negative optical;
- a third lens unit having a surface concave to an object side at a most object side end of the third lens unit wherein the third lens unit consists of a single lens element;
- a fourth lens is moved during a zooming operation; and
- a low pass filter,
  - wherein the zooming operation is performed by varying distances between the first, second, third and fourth lens units.

33. A zoom lens system comprising:
- a first lens unit having a positive optical power;
- a second lens unit having a negative optical power;
- a third lens unit having a surface concave to an object side at a most object side end of the third lens unit;
- a fourth lens unit consists of a bonded lens element consisting of a negative lens element and a positive lens element; and
- a low pass filter,
  - wherein a zooming operation is performed by varying distances between the first, second, third and fourth lens units.

* * * * *